United States Patent
Kesavareddigari et al.

(10) Patent No.: US 12,532,178 B2
(45) Date of Patent: Jan. 20, 2026

(54) MITIGATING THE EFFECTS OF DISINFORMING ROGUE ACTORS IN PERCEPTIVE WIRELESS COMMUNICATIONS

(71) Applicant: QUALCOMM Incorporated, San Diego, CA (US)

(72) Inventors: Himaja Kesavareddigari, Bridgewater, NJ (US); Qing Li, Princeton Junction, NJ (US); Kapil Gulati, Belle Mead, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 18/069,994

(22) Filed: Dec. 21, 2022

(65) Prior Publication Data

US 2024/0214812 A1 Jun. 27, 2024

(51) Int. Cl.
*G06F 15/16* (2006.01)
*G06F 9/54* (2006.01)
(Continued)

(52) U.S. Cl.
CPC ....... *H04W 12/122* (2021.01); *H04W 12/082* (2021.01)

(58) Field of Classification Search
CPC .. H04W 12/122; H04W 12/082; H04W 12/12
(Continued)

(56) References Cited

U.S. PATENT DOCUMENTS 4,928,242 A * 5/1990 Suzuki .................... G01P 21/02
73/114.25
8,645,535 B1 * 2/2014 Martini ................. H04W 12/08
709/224
(Continued)

FOREIGN PATENT DOCUMENTS

WO WO-2020205597 A1 * 10/2020 .......... B60W 30/182

OTHER PUBLICATIONS

International Search Report and Written Opinion—PCT/US2023/083001—ISA/EPO—Mar. 11, 2024.
(Continued)

*Primary Examiner* — Hamza N Algibhah
(74) *Attorney, Agent, or Firm* — Procopio, Cory, Hargreaves & Savitch LLP / QUALCOMM Incorporated

(57) ABSTRACT

An apparatus configured to revoke, for one or more wireless devices, access to at least one service for at least one context in response to the one or more wireless devices providing incorrect data elements for a wireless communication service, and output an indication for data from the one or more wireless devices to be excluded from subsequent processing for the at least one service in the at least one context. An additional apparatus configured to provide a first set of data elements for processing by a set of service entities, receive an indication that at least one component of the first wireless device provides incorrect data elements for a wireless communication service, and omit information derived from the at least one component of the first wireless device in subsequent sets of data elements corresponding to the first set of data elements provided for the set of service entities.

31 Claims, 17 Drawing Sheets

(51) Int. Cl.
*H04L 29/06* (2006.01)
*H04W 12/082* (2021.01)
*H04W 12/122* (2021.01)

(58) Field of Classification Search
USPC .......................................................... 726/23
See application file for complete search history.

(56) References Cited

U.S. PATENT DOCUMENTS

| | | | | |
|---|---|---|---|---|
| 9,383,708 | B1* | 7/2016 | Imaizumi | G03G 15/70 |
| 9,888,371 | B1* | 2/2018 | Jacob | G08B 25/08 |
| 10,725,157 | B1* | 7/2020 | Yates | G01S 7/4816 |
| 10,771,489 | B1* | 9/2020 | Bisht | G06N 20/00 |
| 11,057,774 | B1* | 7/2021 | Shaw | H04W 12/122 |
| 11,115,824 | B1* | 9/2021 | Shaw | H04W 12/122 |
| 11,218,881 | B1* | 1/2022 | De | H04W 12/63 |
| 11,748,757 | B1* | 9/2023 | Segal | G06Q 20/34 |
| | | | | 705/44 |
| 11,781,890 | B2* | 10/2023 | Pogorelik | B64U 10/14 |
| | | | | 702/183 |
| 2006/0080534 | A1* | 4/2006 | Yeap | G06F 21/33 |
| | | | | 713/176 |
| 2006/0224357 | A1* | 10/2006 | Taware | G07C 5/085 |
| | | | | 702/179 |
| 2009/0288140 | A1* | 11/2009 | Huber | G07F 9/001 |
| | | | | 726/2 |
| 2016/0007294 | A1* | 1/2016 | Näslund | H04W 52/0238 |
| | | | | 713/168 |
| 2016/0285717 | A1* | 9/2016 | Kim | H04L 41/0631 |
| 2016/0381068 | A1* | 12/2016 | Galula | G07C 5/0816 |
| | | | | 726/23 |
| 2017/0278323 | A1* | 9/2017 | Gupta | B60W 50/14 |
| 2018/0124093 | A1* | 5/2018 | Schwartz | H04W 12/12 |
| 2018/0255082 | A1* | 9/2018 | Ostergaard | G06N 20/00 |
| 2019/0059032 | A1* | 2/2019 | Han | H04W 36/08 |
| 2019/0068625 | A1* | 2/2019 | Alfano | H04L 67/535 |
| 2019/0190045 | A1* | 6/2019 | Suh | H01M 8/04559 |
| 2020/0162925 | A1* | 5/2020 | Miao | H04W 12/66 |
| 2020/0412752 | A1* | 12/2020 | Shapoury | H04L 63/1433 |
| 2020/0412758 | A1* | 12/2020 | Trivellato | G06F 21/577 |
| 2021/0133670 | A1* | 5/2021 | Cella | G06N 3/044 |
| 2021/0168615 | A1* | 6/2021 | Guan | H04W 12/122 |
| 2021/0329011 | A1* | 10/2021 | Shaw | H04W 12/12 |
| 2021/0389417 | A1* | 12/2021 | Bakucz | G01S 13/04 |
| 2022/0093279 | A1* | 3/2022 | Marinescu | G06N 5/02 |
| 2022/0196211 | A1* | 6/2022 | Finne | F17C 13/026 |
| 2022/0353688 | A1* | 11/2022 | Shuman | H04W 12/122 |
| 2022/0371607 | A1* | 11/2022 | Uhlig | B60W 50/029 |
| 2022/0404235 | A1* | 12/2022 | Cader | G01D 3/08 |
| 2023/0008256 | A1* | 1/2023 | Dillard | G06Q 30/0205 |
| 2023/0362651 | A1* | 11/2023 | Lie | H04W 12/30 |
| 2023/0415756 | A1* | 12/2023 | Komar | B60W 50/0205 |
| 2024/0214797 | A1 | 6/2024 | Kesavareddigari et al. | |
| 2024/0214814 | A1 | 6/2024 | Kesavareddigari et al. | |
| 2024/0224040 | A1* | 7/2024 | Madi | H04W 12/12 |

OTHER PUBLICATIONS

Grover J., et al., "Machine Learning Approach for Multiple Misbehavior Detection in VANET", Communications in Computer and Information Science, Jul. 2011, 11 pages.

Liu Y., et al., "An Access Control Mechanism Based on Risk Prediction for the IoV", 2020 IEEE 91st Vehicular Technology Conference (VTC2020—Spring), IEEE, May 25-28, 2020, 5 Pages.

Liu Y., et al., "An Intelligent Edge-Chain-Enabled Access Control Mechanism for IoV", IEEE Internet of Things Journal, vol. 8, No. 15, Aug. 1, 2021, pp. 12231-12241.

Raya M., et al., "Eviction of Misbehaving and Faulty Nodes in Vehicular Networks", IEEE Journal on Selected Areas in Communications, vol. 25, No. 8, Oct. 2007, pp. 1557-1568.

Weng J-S., et al., "BENBI: Scalable and Dynamic Access Control on the Northbound Interface of SDN-Based VANET", IEEE Transactions on Vehicular Technology, vol. 68, No. 1, Jan. 2019, pp. 822-831.

\* cited by examiner

MITIGATING THE EFFECTS OF DISINFORMING ROGUE ACTORS IN PERCEPTIVE WIRELESS COMMUNICATIONS

INTRODUCTION

The present disclosure relates generally to communication systems, and more particularly, to perceptive wireless communications. More specifically, the present disclosure relates to maintaining data quality for perceptive wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method of wireless communication at a first network node is provided. The method includes revoking, for one or more wireless devices, access to at least one service in response to the one or more wireless devices providing incorrect data elements for a wireless communication service; and outputting an indication for data from the one or more wireless devices to be excluded from subsequent processing for at least one service in at least one context.

In an aspect of the disclosure, a computer-readable storage medium storing computer executable code for wireless communication at a first network node is provided. The code when executed by a processor causes the processor to revoke, for one or more wireless devices, access to at least one service in response to the one or more wireless devices providing incorrect data elements for a wireless communication service; and output an indication for data from the one or more wireless devices to be excluded from subsequent processing for the at least one service in at least one context.

In an aspect of the disclosure, an apparatus for wireless communication at a first network node is provided. The apparatus includes means for revoking, for one or more wireless devices, access to at least one service in response to the one or more wireless devices providing incorrect data elements for a wireless communication service; and means for outputting an indication for data from the one or more wireless devices to be excluded from subsequent processing for at least one service in at least one context.

In an aspect of the disclosure, an apparatus for wireless communication at a first network node is provided. The apparatus includes memory and at least one processor coupled to the memory and configured to revoke, for one or more wireless devices, access to at least one service in response to the one or more wireless devices providing incorrect data elements for a wireless communication service; and output an indication for data from the one or more wireless devices to be excluded from subsequent processing for the at least one service in at least one context.

In an aspect of the disclosure, a method of wireless communication at a first wireless device is provided. The method includes providing a first set of data elements for processing by a set of service entities; receiving an indication that at least one component of the first wireless device provides incorrect data elements for a wireless communication service; and omitting information derived from the at least one component of the first wireless device in subsequent sets of data elements corresponding to the first set of data elements provided for the processing by the set of service entities.

In an aspect of the disclosure, a computer-readable storage medium storing computer executable code for wireless communication at a first wireless device is provided. The code when executed by a processor causes the processor to provide a first set of data elements for processing by a set of service entities; receive an indication that at least one component of the first wireless device provides incorrect data elements for a wireless communication service; and omit information derived from the at least one component of the first wireless device in subsequent sets of data elements corresponding to the first set of data elements provided for the processing by the set of service entities.

In an aspect of the disclosure, an apparatus for wireless communication at a first wireless device is provided. The apparatus includes means for providing a first set of data elements for processing by a set of service entities; means for receiving an indication that at least one component of the first wireless device provides incorrect data elements for a wireless communication service; and means for omitting information derived from the at least one component of the first wireless device in subsequent sets of data elements corresponding to the first set of data elements provided for the processing by the set of service entities.

In an aspect of the disclosure, an apparatus for wireless communication at a first wireless device is provided. The apparatus includes memory and at least one processor coupled to the memory and configured to provide a first set of data elements for processing by a set of service entities; receive an indication that at least one component of the first wireless device provides incorrect data elements for a wireless communication service; and omit information derived from the at least one component of the first wireless device in subsequent sets of data elements corresponding to the first set of data elements provided for the processing by the set of service entities.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
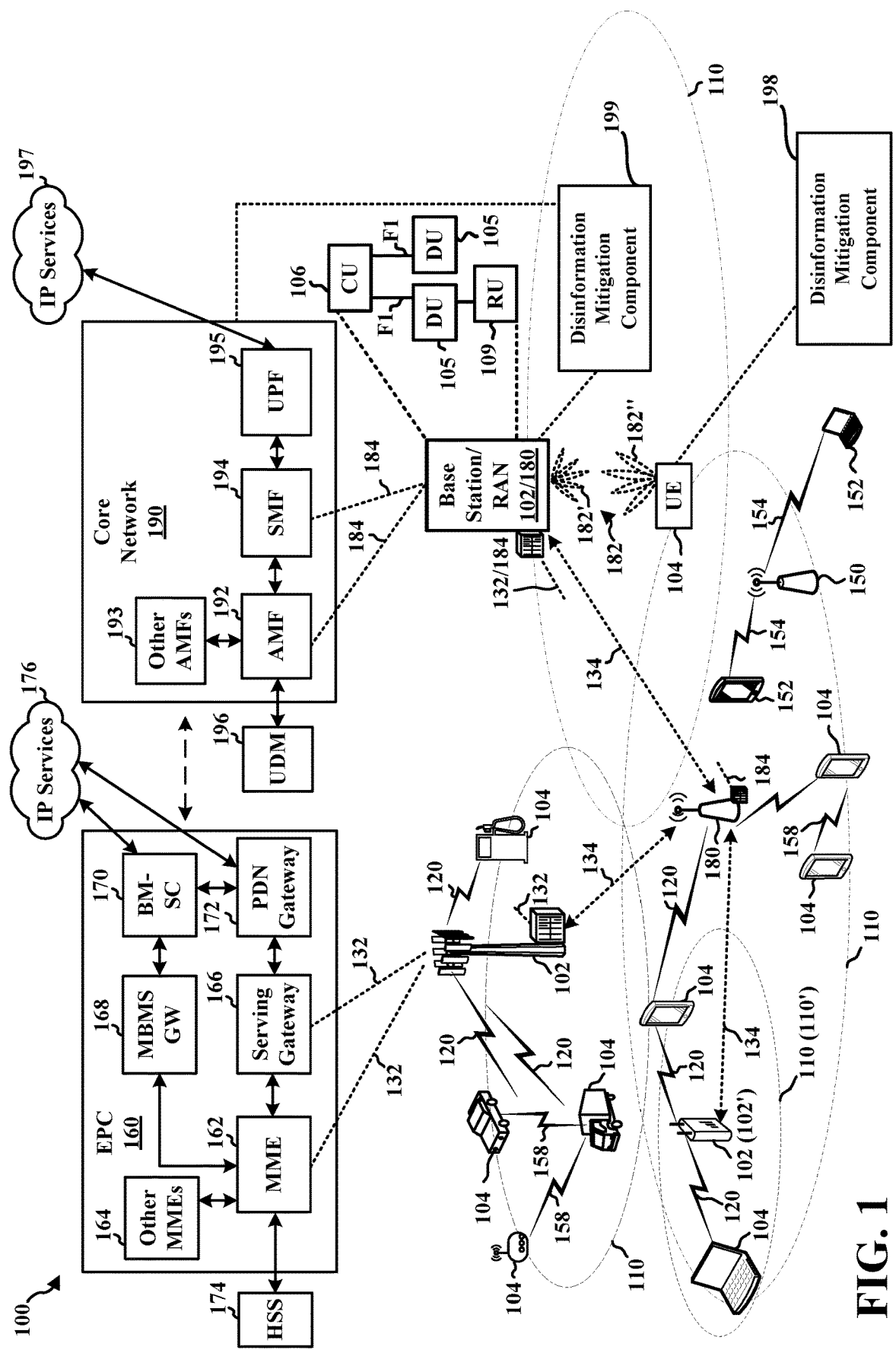
FIG. 1 is a diagram illustrating an example of a wireless communications system and an access network.

In some aspects of wireless communication, a communication network may include perceptive wireless communication components. There may be various classifications for actors in the perceptive wireless communication components, e.g., indicating whether an actor provides accurate/reliable data or inaccurate/unreliable data. In other aspects, the classification may indicate whether the inaccurate/unreliable data is unintentional, e.g., non-malicious due to a sensor error, or intentional from a malicious actor. Aspects presented herein enable a classification of actors within a first (local) geographical area in a perceptive wireless communication system to be shared on-demand in order to improve the management of data collection and usage from different actors within the perceptive wireless communication system. Aspects presented herein enable access to be revoked for a source of inaccurate information. By revoking the access, the system and/or network entity may prevent information received from a rogue actor from being accepted as input for propagation and/or processing by the network entity or network function associated with the network entity. On-demand classification sharing may, in some aspects, reduce memory and communication overhead associated with sharing actor classifications associated with a large geographic area while providing information regarding classifications of actors that are within a smaller (local) geographic area that are relevant to one or more network elements in the smaller (local) geographic area.

Perceptive wireless communication may relate to communication systems that are assisted by the perception of the physical environment/world. The perception of the physical environment/world, in some aspects, may include, e.g., measurement data and machine learning feature data gathered from vehicular (or other device) sensors, such as RADAR, LIDAR, cameras, Global Navigation Satellite System (GNSS), or inertial measurement unit (IMU) sensors. Communications tasks that benefit from perception, in some aspects, include beam management, beam blockage prediction, beam refinement, etc.

Perceptive wireless communication (e.g., associated with a wireless communication system providing a wireless communication service) may be affected by incorrect and/or misleading information from associated devices (and/or device components). For a network comprising a number of network nodes spread over a large geographic area, maintaining a centralized list (or identification) of devices providing incorrect and/or misleading information for the large geographic area may demand and/or consume too many resources (e.g., too much storage space and/or memory or too much bandwidth for transmitting the information regarding the list or identification of devices). Accordingly, in some aspect of the disclosure, a method and/or apparatus is provided for maintaining manageable lists (e.g., lists that consume an acceptable amount of memory or bandwidth when transmitting information related to the list) of devices providing incorrect and/or misleading information while maintaining the integrity and/or accuracy of the perceptive wireless communication. The method and/or apparatus, in some aspects, uses a combination of centralized (e.g., for limited geographical regions) and local (e.g., at particular network elements or devices) access lists (or identification) of devices that have been classified as providing incorrect and/or misleading information as will discussed in more detail below.

The detailed description set forth below in connection with the drawings describes various configurations, and the concepts described herein may be practiced in additional configurations. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station (e.g., one of the base stations 102 or one of base stations 180) may be referred to as a RAN and may include aggregated or disaggregated components. As an example of a disaggregated RAN, a base station may include a central unit (CU) (e.g. a CU 106), one or more distributed units (DU) (e.g., a DU 105), and/or one or more remote units (RU) (e.g., an RU 109), as illustrated in FIG. 1. A RAN may be disaggregated with a split between the RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs may be connected via an F1 interface. A DU 105 and an RU 109 may be connected via a fronthaul interface. A connection between the CU 106 and a DU 105 may be referred to as a midhaul, and a connection between a DU 105 and the RU 109 may be referred to as a fronthaul. The connection between the CU 106 and the core network 190 may be referred to as the backhaul.

The RAN may be based on a functional split between various components of the RAN, e.g., between the CU 106, the DU 105, or the RU 109. The CU 106 may be configured to perform one or more aspects of a wireless communication protocol, e.g., handling one or more layers of a protocol stack, and the one or more DUs may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. The CU 106 may host higher layer functions, e.g., above the RLC layer, such as a service data adaptation protocol (SDAP) layer, a packet data convergence protocol (PDCP) layer, and/or an upper layer. In other implementations, the split between the layer functions provided by the CU, the DU, or the RU may be different.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 160. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a wireless device such as the UE 104 may include a disinformation mitigation component 198 configured to provide a first set of data elements for processing by a set of service entities; receive an indication that at least one component of the first wireless device provides incorrect data elements for a wireless communication service; and omit information derived from the at least one component of the first wireless device in subsequent sets of data elements corresponding to the first set of data elements provided for the processing by the set of service entities. In certain aspects, the base station 180, or a component of a base station, may include a disinformation mitigation component 199 configured to revoke, for one or more wireless devices, access to at least one service in response to the one or more wireless devices providing incorrect data elements for a wireless communication service; and output an indication for data from the one or more wireless devices to be excluded from subsequent processing for the at least one service in at least one context. Although the following description may be focused on 5G NR, the concepts described herein may be applicable to other similar areas, such as LTE, LTE-A, CDMA, GSM, and other wireless technologies.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
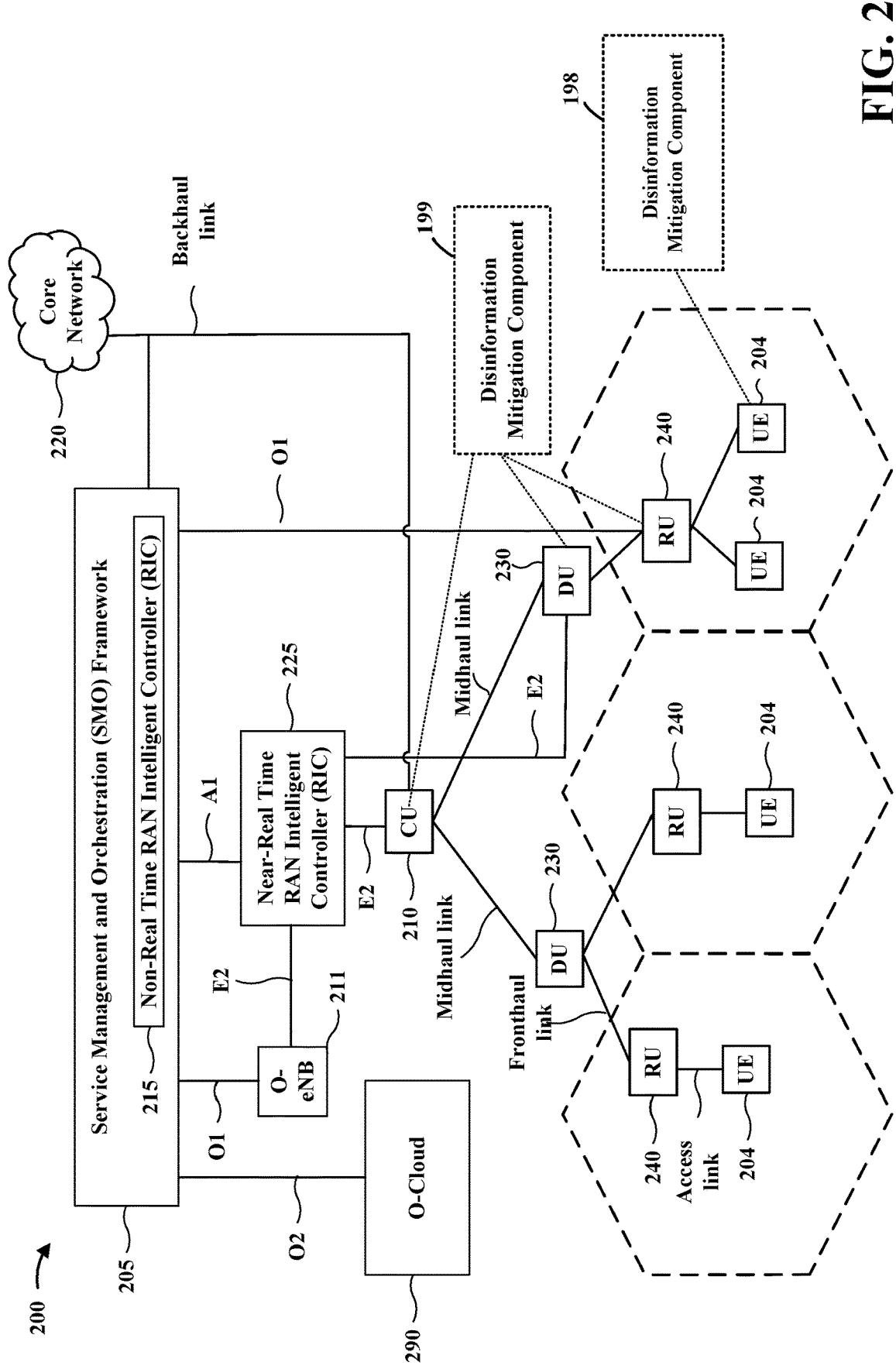
FIG. 2 shows a diagram illustrating an example disaggregated base station architecture.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 204 via one or more radio frequency (RF) access links. In some implementations, the UE 204 may be simultaneously served by multiple RUs 240.

Each of the units, i.e., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 204. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, AI/ML workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

A wireless device such as the UE 104 may include a disinformation mitigation component 198 configured to provide a first set of data elements for processing by a set of service entities. The disinformation mitigation component 198 may further be configured to receive an indication that at least one component of the first wireless device provides incorrect data elements for a wireless communication service. The disinformation mitigation component 198 may further be configured to omit information derived from the at least one component of the first wireless device in subsequent first sets of data elements provided for the processing by the set of service entities. In certain aspects, one or more of the CU 210, the DU 230, or the RU 240 may include a disinformation mitigation component 199 configured to revoke, for one or more wireless devices, access to at least one service in response to the one or more wireless devices providing incorrect data elements for a wireless communication service. The disinformation mitigation component 199 may further be configured to output an indication indicating for data from the one or more wireless devices to be excluded from subsequent processing for the at least one service in at least one context.

Figure 3:
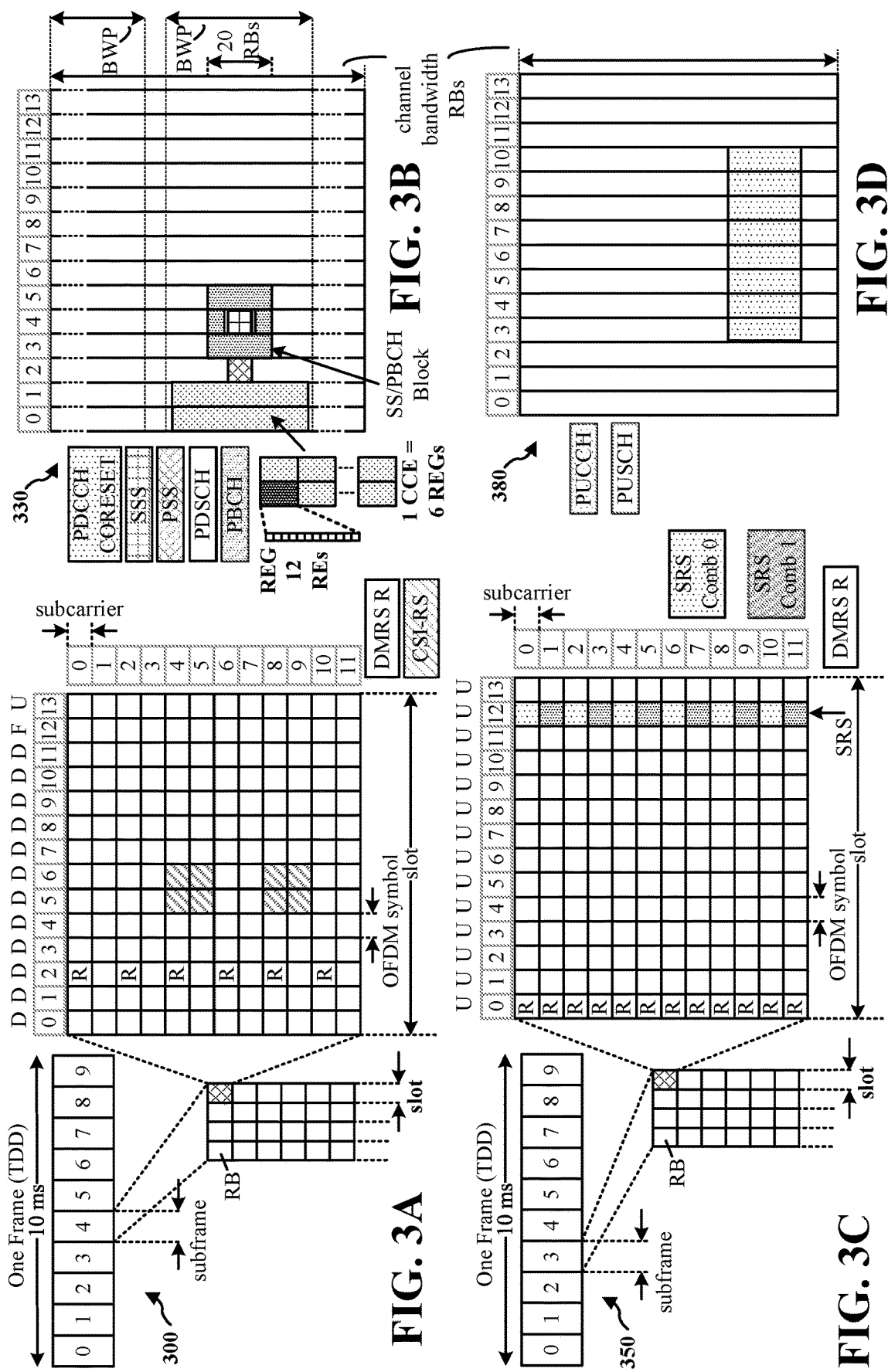
FIG. 3A is a diagram illustrating an example of a first frame, in accordance with various aspects of the present disclosure.
FIG. 3B is a diagram illustrating an example of downlink (DL) channels within a subframe, in accordance with various aspects of the present disclosure.
FIG. 3C is a diagram illustrating an example of a second frame, in accordance with various aspects of the present disclosure.
FIG. 3D is a diagram illustrating an example of uplink (UL) channels within a subframe, in accordance with various aspects of the present disclosure.

FIG. 3A is a diagram 300 illustrating an example of a first subframe within a 5G NR frame structure. FIG. 3B is a diagram 330 illustrating an example of DL channels within a 5G NR subframe. FIG. 3C is a diagram 350 illustrating an example of a second subframe within a 5G NR frame structure. FIG. 3D is a diagram 380 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 3A-3D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 3A-3D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 3B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 4:
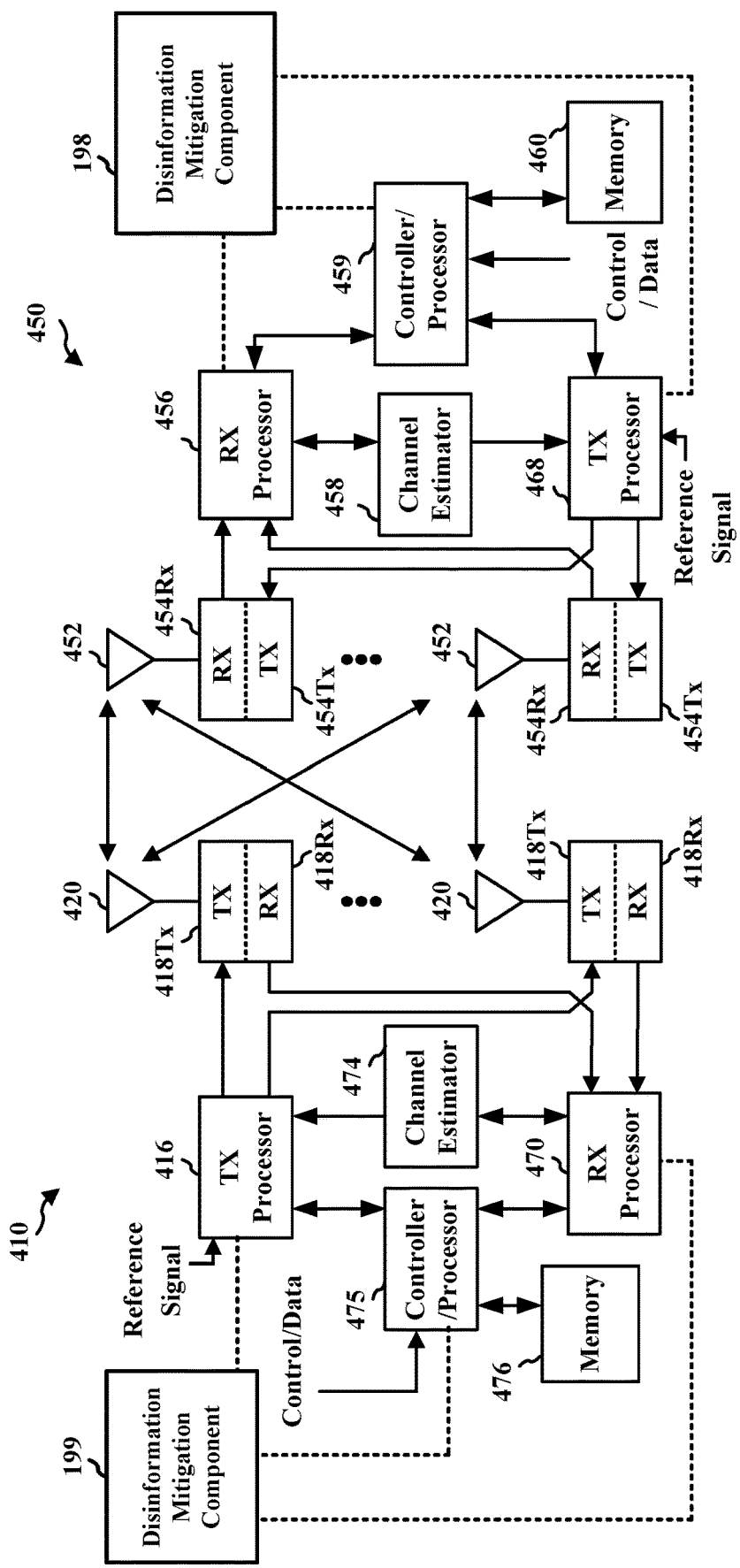
FIG. 4 is a diagram illustrating an example of a base station and user equipment (UE) in an access network.

FIG. 4 is a block diagram of a base station 410 in communication with a UE 450 in an access network. In the DL, Internet protocol (IP) packets may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418Tx. Each transmitter 418Tx may modulate a radio frequency (RF) carrier with a respective spatial stream for transmission.

At the UE 450, each receiver 454Rx receives a signal through its respective antenna 452. Each receiver 454Rx recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454Tx. Each transmitter 454Tx may modulate an RF carrier with a respective spatial stream for transmission.

The UL transmission is processed at the base station 410 in a manner similar to that described in connection with the receiver function at the UE 450. Each receiver 418Rx receives a signal through its respective antenna 420. Each receiver 418Rx recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets. The controller/processor 475 is also responsible for error detection using an ACK and/or NACK protocol to support HARQ operations.

At least one of the TX processor 468, the RX processor 456, and the controller/processor 459 may be configured to perform aspects in connection with the disinformation mitigation component 198 of FIG. 1 or 2.

At least one of the TX processor 416, the RX processor 470, and the controller/processor 475 may be configured to perform aspects in connection with the disinformation mitigation component 199 of FIG. 1 or 2.

In some aspects of wireless communication, a communication network may include perceptive wireless communication components. Perceptive wireless communication may relate to communication systems that are assisted by the perception of the physical environment/world. The perception of the physical environment/world, in some aspects, includes measurement data and machine learning feature data gathered from vehicular sensors, e.g., RADAR, LIDAR, cameras, GNSS, IMU sensors. Communications tasks that benefit from perception, in some aspects, include beam management, beam blockage prediction, beam refinement, etc.

In some aspects, sensing-related measurement data and feature data gathered from vehicles, may be combined with communications-related measurements and feature data to improve and/or refine the quality and/or efficiency of the communication systems. Perceptive wireless communication, thus, may involve reliable coordination, at multiple stages, between multiple independent agents/actors. In some aspects, the actors may include pedestrian UEs, in-vehicle UEs, vehicles, vehicular sensors, GPS devices, and/or other similar devices providing data for processing by (or propagating through) one or more ML training/inference servers.

As a non-limiting example of perceptive wireless communication, sensing-related measurement data and feature data (e.g., data regarding a physical environment or objects in a surrounding environment) gathered from vehicles, may be combined with communications-related measurements and feature data to improve and/or refine the quality and/or efficiency of the communication systems. Perceptive wireless communication, thus, may involve reliable coordination, at multiple stages, between multiple independent agents/actors. In some aspects, the actors may include pedestrian UEs (e.g., associated with a vulnerable road user or VRU), in-vehicle UEs, vehicles, vehicular sensors, GPS devices, and/or other similar devices providing data for processing by (or propagating through) one or more artificial intelligence (AI)/machine learning (ML) (AI/ML) training/inference servers and/or agents.

In some aspects, generative and/or discriminative learning may be used to identify (or classify) actors as honest (e.g., non-malicious) or malicious and may further be used to identify honest actors as being rogue (e.g., providing inaccurate information) or non-rogue (e.g., providing reliable/accurate information). In some aspects, a rogue actor may be referred to as an inaccurate actor, and a non-rogue actor may be referred to as an accurate actor. Other names or information properties or classifications may be used to distinguish between sources of accurate information and sources of inaccurate information.

An actor, in some aspects, may be an independent, active component contributing to the perceptive wireless communication (e.g., a particular perceptive wireless communication task). According to one or more examples, the rogue actor may be any of a sensor data collector (SDC), a vehicle along with its onboard sensors, an in-vehicle cellular UE, a pedestrian UE, and/or an ML training/inference host (e.g., a local component at a UE that processes data). Actors may be defined at different levels of granularity, e.g., a vehicle (together with its onboard sensors) may be an actor at a first level of granularity and/or a single SDC on the same vehicle could be another actor at a second level of granularity.

Actors may be classified as one of a plurality of different types of actors, e.g., as honest (non-rogue) actors, non-malicious (misinforming or unintentional) rogue actors, or malicious (disinforming or intentional) rogues and that the methods below may be applied to disinforming rogue actors. An honest actor may refer to an actor or device that provides accurate/correct information to the network or to another device in the network, and may also be referred to as a non-rogue actor or device.

In some aspects, rogue actors may include actors providing inaccurate, misleading, or false information. The inaccurate, false, or misleading information may also be referred to as misinformation, disinformation, or unreliable information. There may be different types of rogue actors. For example, some rogue actors may unintentionally (e.g., without being aware that the data is inaccurate, false, or misleading) provide inaccurate or misleading information to the network, such as location information from the GNSS sensor of a vehicle during a period of acceleration. Accurate information may also be referred to as reliable information. A rogue actor that unintentionally provides inaccurate, false, or misleading data may be referred to as a non-malicious rogue actor. Another type of rogue actor or device may intentionally provide inaccurate, false, or misleading information, and may be referred to as a malicious rogue actor.

Rogue actors (actors whose information has errors with high mean and/or high-variance; actors whose information is misleading, incorrect, inaccurate, mistaken, corrupted, and/or deceptive) can introduce or cause error propagation at multiple stages of a perceptive wireless communication procedure. A rogue actor may supply incorrect information to the process either deliberately, based on a failed sensor, and/or based on tampering by an external agent. Incorrect information, in some aspects may be supplied unintentionally and may be based on a more transitory basis than disinformation, for example, based on a transitory situation/context such as during a maneuver that causes one or more types of information to be incorrect or misleading. Intentional inaccurate or incorrect information may be referred to as disinformation, whereas unintentional inaccurate/incorrect information may be referred to as misinformation. In some aspects, for a misinforming actor, other (non-rogue) actors (e.g., UEs) in the same environment and/or context, having received a same configuration from the network as the misinforming actor, may send incorrect values for the same data element with a (same) non-zero probability. In other words, a misinforming actor may be a non-malicious actor such that other non-malicious actors in a similar (or same) location receiving a same configuration from the network would be likely (with a non-zero probability) to provide incorrect information. However, for a disinforming actor, other (non-rogue) actors (e.g., UEs) in the same environment and/or context, having received a same configuration from the network as the disinforming actor, may transmit incorrect values for the same data element with probability nearing zero. For example, a disinforming actor may be a malicious actor such that non-malicious actors in a similar (or same) location receiving a same configuration from the network would not be likely to provide incorrect information (e.g., with a probability near zero).

The misleading or incorrect information (e.g., misinformation) may include a set of data elements (e.g., information from one or more components of an actor that may be communicated to other devices) including one or more of raw sensing data, bounding boxes (indicating a spatial extent of an identified object), and other features extracted from onboard ML models, UE/wireless device location, UE/wireless device orientation/velocity, and/or beam measurements at the UE. For either disinformation or misinformation, incorrect outputs (data elements received from a rogue actor) at a first operation (or to a first network, or wireless, device) may lead to incorrect inputs/outputs at the next operation (or for another network, or wireless, device) of a perceptive wireless communication task. For example, incorrect information relating to bounding boxes of different objects in a first environment may lead to an incorrect beam blocking prediction. Therefore, one or more rogue actors can severely degrade the benefits of coordination among multiple actors, most of which may not be rogue actors. The ability to produce accurate results in the presence of such rogue actors may improve the usefulness (e.g., accuracy) of the perceptive wireless communication.

A rogue actor may supply incorrect information to the process either deliberately or unintentionally (e.g., based on a failed sensor or other situational/contextual issues). For either disinformation or misinformation, incorrect outputs (data elements received from a rogue actor) from one operation may lead to incorrect inputs/outputs at a related operation. For example, incorrect information relating to bounding boxes of different objects in a first environment may lead to an incorrect beam blocking prediction. In some aspects, misinformation may be caused by intermittent occlusion of a sensor in consecutive time instants leading to inconsistent estimates of the environment, or a (rapidly) changing location, velocity, and/or relative position of elements and/or devices in the environment. In some aspects, each vehicle may be assumed to have a central computing and/or memory equipment that is independent of the onboard computer and may be assumed to be tamper-proof. Unlike the case of misinformation, a sensor may not be counted as an independent actor in the case of disinformation. In some aspects, the disclosure is based on (1) a central network entity such as a base station that operates without external tampering (e.g., is tamper-proof), (2) one or more vehicular UEs that have central equipment that operate without external tampering (e.g., is tamper-proof) or that are assumed tamper-proof (e.g., cannot be modified by an external source), and (3) that trusted vehicular UEs can maintain the access permissions of their own onboard sensors and computers. For example, as long as the vehicle is not rogue (e.g., the central equipment remains untampered and/or unmodified), the vehicle may control the exclusion of any disinforming sensors (including tampered or damaged sensors). The vehicle control of the exclusion may be indicated to the vehicle by a network entity in a wireless network. The vehicle control of the exclusion may be indicated to the vehicle by a network entity in a wireless network, and the vehicle may in turn, indicate to a central network entity in a wireless network for the central network entity to exclude the information associated with the disinforming sensors.

For the following discussion, it may be assumed the actors have already been classified between different types of actors as honest (non-rogue), non-malicious (misinforming or unintentional) rogues, or malicious (disinforming or intentional) rogues) and that the methods below may be applied to disinforming rogue actors. In some aspects, generative and/or discriminative learning may be used to identify (or classify) actors as honest, non-malicious, or malicious and may further be used to identify actors as being rogue (e.g., providing misinformation) or non-rogue (e.g., providing reliable information). In some aspects, non-malicious may generally refer to both misinforming and honest actors as neither purposely provides incorrect or misleading information. In some aspects, a rogue actor may be referred to as an inaccurate actor, and a non-rogue actor may be referred to as an accurate actor. Other names or classifications may be used to distinguish between sources of accurate information and sources of inaccurate information. In some aspects, generative and/or discriminative learning may include learning the distribution of incoming data for each environment and subsequently identifying outliers. The generative learning model may include one or more of generative adversarial networks (GANs), variational autoencoders (VAEs), or other generative/discriminative algorithms.

For example, a generator network, G, may learn a distribution of the external incoming dataset/datastream and generate a sample (for a given noisy seed) with the aim of making it indistinguishable from the external incoming dataset to a discriminator network. D. The discriminator network. D, may be used, for a given input (picked arbitrarily from either G or the dataset), to learn and return a likelihood that the input is drawn from the dataset/datastream and is not a creation of the generator G.

Accordingly, training the rogue identification modules could involve training (1) a unique generator $G_0$ with multiple $D_n$'s, (2) multiple $G_m$-$D_n$ pairs, and (3) multiple $G_m$'s with one $D_0$ acting as classifier (uniquely-trained $G_m$'s for highway, intersections, etc.) Further, a rogue identification module might be trained to individually identify errors at each stage of the beam management procedure and jointly identify multiple errors accumulated over multiple stages of the beam management procedure.

For an honest rogue actor, the errors (e.g., misinformation) may persist for an extended time period (e.g., a 'misinformation period' having a duration of seconds to minutes/hours) but may ultimately be temporary. The perceptive wireless communication system, in accordance with some aspects of the disclosure, may be provided with a method to temporarily exclude and/or discard data from such honest rogue actors during the duration of the misinformation period while accepting/propagating data from the honest actors after the misinformation period is over and the data from the actor is expected to be accurate and/or reliable again. Blocking, revoking the access permissions, inclusion on an access revocation list, or changing the access key for the actor permanently, could lead to (1) disregarding all future information from the actor (including accurate and/or reliable information) and (2) a state in which most, or substantially all, of the actors are blocked such that the network stops receiving data from the actors even after the information becomes accurate and/or reliable. Either of these outcomes may reduce the usefulness of the perceptive wireless communication system. However, constant re-evaluation may increase overhead for the actors and the network.

For a disinforming rogue actor, the errors may be assumed to be permanent (or effectively permanent or near-permanent) such that the disinforming rogue actor may be permanently blocked (e.g., access permission may be permanently revoked). The permanent blocking may include placing an identifier of the disinforming rogue actor into a list, database, or other data structure of blocked actors. The system, in some aspects, may not provide a time-based criteria for reassessment. In some aspects, reassessment criteria may be provided that relate to replacement or repair of the rogue components or actors (e.g., malfunctioning sensors, in-vehicle cellular UEs, etc.). The disinformation may take the form of (or may be implemented by the disinforming rogue actor as) modified packets (e.g., transmitted information) and/or packets designed to imitate valid packets from the actor. The modification and/or imitation, in some aspects, may involve one or more of (1) spoofing or utilizing the identifying information of another actor, (2) matching a location, speed, RSRP, or other characteristic (e.g., a past and/or out of date value) associated with the disinforming rogue actor, (3) distorting machine learning outputs (such as bounding boxes, their confidences), and/or (4) modifying packets, delaying packets and/or creating duplicates of packets (e.g., for V2V communications). In some aspects, the disinformation may lead to (or be intended to lead to) reallocation of cellular resources, traffic jams, and accidents.

In some aspects, detection of intentional tampering by a disinforming rogue actor may be identified and/or detected by a combination of AI/ML and non-AI/ML algorithms trained to detect evidence of tampering from the incoming sensing and other quantitative data. For example, fabricated sensing images and/or measurement data may be detected by GANs, VAEs, or other generative/discriminative algorithms. In some aspects altered packets (checksum) and/or duplicated or imitated packets (sensing data, history) may be detected by dedicated algorithms. Based on the detection and/or identification, permission may be revoked for the source of tampered information. By revoking the permission, the system and/or network entity may prevent information received from the disinforming rogue actor from being accepted as input for propagation and/or processing by the network entity or network function associated with the network entity.

In some aspects, if an actor is classified as a disinforming rogue by the classifier its access permissions may be revoked. The access permission revocation, in some aspects, may be achieved by placing the actor on an access list (e.g., a block or restricted access list). In some aspects, the access list may be used to manage access to a set of service entities that utilize information collected from multiple UEs to improve wireless communication or provide services to the individual participating UEs to improve wireless communication as described above. Management of access to the set of service entities, in some aspects, may be limited on a case-by-case basis, e.g., as a service-based access and/or subscription. For example, a vehicular UE that is an honest actor with a damaged onboard camera may be determined to be disinforming in relation to the image data or other data derived from the onboard camera sensing data and may have its access to image-based ML services revoked. Based on the determination that the vehicular UE is an honest actor, the vehicular UE may retain access to other service entities associated with other sensors or data sources of the vehicular UE. In some aspects, the loss of access to the image-based ML services may persist as long as the camera is not replaced, e.g., the loss of access may be permanent as far as the particular onboard camera is concerned. The access permission revocation, in some aspects, may be context-based such that a vehicular UE whose feature extraction outputs are being classified as deliberately misleading in particular contexts (e.g., when at busy intersections) but not in other contexts, may have its access to ML services revoked only in the context of busy intersections.

Centralized (e.g., for a local geographic area) access permission lists, in some aspects, may be maintained. The centralized access permission lists may then be synchronized or coordinated (e.g., via a handover) between network entities (e.g., AI/ML service entities) or network nodes (e.g., base stations). In some aspects, centralized access lists may not be universal (e.g., may not cover a larger geographic region including a plurality of local geographic areas). The propagation and maintenance of access lists can be controlled by the network entity (such as the gNB) or by the network's service entity. The list may be provided to, and/or shared between, network entities or network nodes on a need-to-know basis or based on adjacency to the network node where the access determination was first made or triggered by mobility of the disinforming actor to keep the list size manageable.

Figure 5:
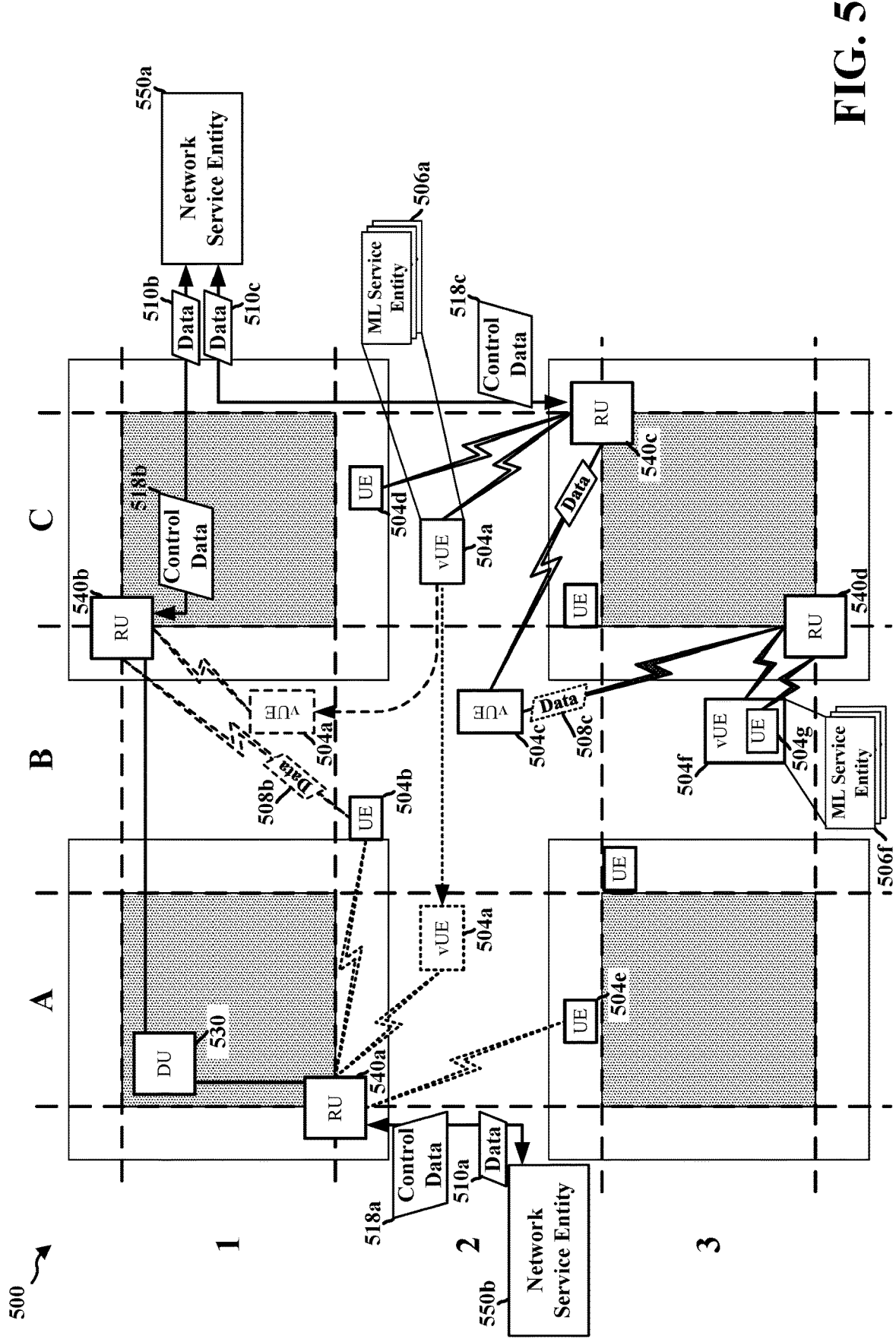
FIG. 5 is a diagram illustrating an example environment in which aspects of the disclosure may be implemented.

FIG. 5 is a diagram 500 illustrating an example environment in which aspects of the disclosure may be implemented. Diagram 500 illustrates that multiple UEs or vehicular UEs (vUEs) may be in communication with multiple base stations or RUs. For example, vUE 504a in a first area "C2" may, at a first time, be in communication with a first RS 540c. At a second time, the vUE 504a may move to one of area B1 or area A2 and may be in communication with one of RU 540b or RU 540a, respectively. The vUE 504a, in some aspects, may be associated with one or more local ML service entities 506a that may be used to process data produced by one or more sensors or components of the vUE 504a. UE 504b may be in communication with a RU 540a, VUE 504c may be in communication with one or more of RU 540c or RU 540d, UE 504d may be in communication with RU 540c, 504e may be in communication with RU 540a. The vUE 504f and UE 504g may be in communication with RU 540d. As illustrated, the vUE 504f may be associated with UE 504g and the vUE 504f and/or the UE 504g may be associated with one or more local ML service entities 506f that may be used to process data produced by one or more sensors or components of the vUE 504f and/or the UE 504g. While not illustrated in association with other UEs or vUEs, each, or any, of UE 504b, vUE 504c, UE 504d, and/or UE 504e may be associated with a local ML service entity for processing data locally to generate data for transmitting and/or reporting to other devices. In some aspects, vUE 504a and/or vUE 504c may be associated with one or more UEs (e.g., UEs belonging to passengers of the vUE). Information (e.g., sensor information) collected by one device may be used by an associated device to improve local data generation in a more direct way and, in some aspects, may be identified as a source of data that may be separately identified as a rogue actor from data provided and/or transmitted by the associated device.

Figure 6:
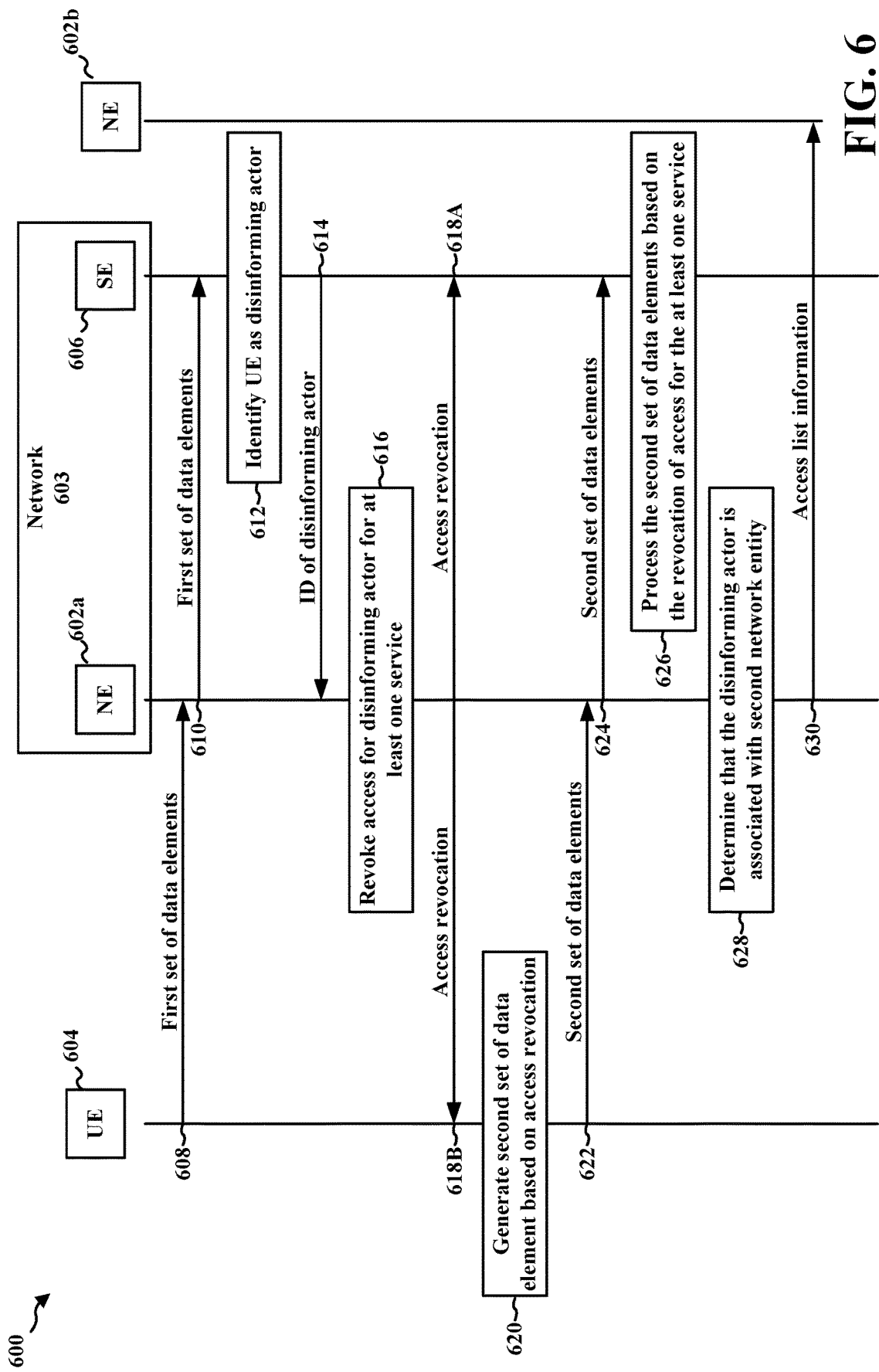
FIG. 6 is a call flow diagram illustrating an interaction of a particular UE interacting with a particular network entity (NE) of a network node including the NE and a service entity (SE) in accordance with some aspects of the disclosure.

FIG. 6 is a call flow diagram 600 illustrating an interaction of a particular UE 604 interacting with a particular network entity (NE) 602a of a network node 603 including the NE 602a and a service entity (SE) 606 in accordance with some aspects of the disclosure. UE 604 may correspond to a wireless device that provides information for a perceptive wireless communication generally, and may be discussed below in relation to any of the UEs or vUEs 504*a*-504*g* illustrated in FIG. 5. The NE 602*a* or the NE 602*b*, in some aspects, may correspond to a network node, base station or component of the network node, of the base station, or of a network that is in communication with a UE generally, and may be discussed below in relation to any of the RUs 540*a*-540*d*. The SE 606, in some aspects, may correspond to a network service entity that provides a service (e.g., a ML-based feature extraction, recommendation, or prediction for improving communication) to the network or to entities in the network, and may be discussed in relation to network service entities 550*a* and 550*b*.

In some aspects, The UE 604 (representing any of the UEs and/or vUEs 504*a*-504*g*) may collect data via a set of sensors. The data may be raw sensing data, e.g., image data, LIDAR data, RADAR data, location data, speed data, channel measurements, or other sensor data collected by a set of one or more sensors associated with the UE 604. The collected data may, in some aspects, be processed locally, e.g., by a local ML service entity of the one or more local ML service entities 506*a* or 506*f*, to derive additional data, e.g., bounding boxes, expected occlusions, or other features of the environment. The UE 604 may transmit (e.g., provide), and the NE 602*a* may receive (obtain), a first set of data elements 608 (corresponding to one of data 508*b* or data 508*c* of FIG. 5) including the sensor data and/or the derived data. The NE 602*a* may output (e.g., transmit), and the SE 606 may obtain (e.g., receive), the first set of data elements 610 (corresponding to one of data 510*a*, data 510*b*, or data 510*c* of FIG. 5).

The SE 606 may then perform an analysis of the data to identify, at 612 the UE 604 (or a component of UE 604) as a disinforming actor (e.g., as providing incorrect perception data) based on the first set of data elements 608 and/or 610. As discussed above, in some aspects, the SE 606 may determine if the UE 604 (e.g., an actor) is a rogue actor (e.g., is providing information that has been tampered with or manipulated) or is an honest, or non-rogue, actor (e.g., is providing information as collected without tampering). The SE 606, in some aspects, may further determine if the information is correct information, misinformation (e.g., incorrect information that is associated with a temporary, or ephemeral, phenomenon or context), or disinformation (e.g., incorrect information that is associated with a more permanent feature of the source of the information). For example, misinformation may be based on a UE experiencing a rapid change in location or orientation such as during a turn, while disinformation may be based on a malicious tampering with, or a spoofing of, data or with a malfunctioning or damaged sensor.

In some aspects, the SE 606 may include at least one of a ML component algorithm and a non-ML component algorithm used to identify the UE 604 as providing incorrect perception data (e.g., being a disinforming actor). The at least one of a ML component algorithm and a non-ML component algorithm, in some aspects, may be at least one of a first component algorithm trained to detect fabricated data elements, a second component algorithm trained to detect altered data elements, a third component algorithm trained to detect one or more of duplicated or imitated data elements, or a fourth component algorithm trained to detect delayed reports of data elements. In some aspects, identifying, at 612, the UE 604 as providing incorrect perception data based on the first set of data elements 608 or 610 may include identifying, with a threshold probability, that subsequent sets of data elements obtained from the first wireless device are likely to include incorrect data elements for a first time period (e.g., until a change to an identifiable combination of internal and external conditions of the first wireless device). Identifying that subsequent sets of data elements obtained from the first wireless device are likely to include incorrect data elements for a first time period with a threshold probability, in some aspects, may be part of a continuing assessment (either periodic or event-triggered) of the probability of the subsequent sets of data elements being disinformation for the same wireless device for the same service within the same context for a given interval of time. For example, the first time period may be a time until a malfunctioning sensor is replaced or until the first wireless device leaves a first context in which the incorrect data elements are identified as being likely to include incorrect data elements with the threshold probability. Identifying, at 612, that the first wireless device of the one or more wireless devices provides incorrect data elements, in some aspects, may include at least one of identifying that the UE 604 is configured to provide incorrect data elements or that the UE 604 is associated with at least one malfunctioning sensor from which the incorrect data elements is derived.

Based on identifying the disinforming actor at 612, the SE 606 may output (e.g., transmit), and NE 602*a* may obtain (e.g., receive), an identifier (ID) 614 of the UE 604 (or component of UE 604) identified as a disinforming actor. Based on obtaining the ID 614 of the disinforming actor, the NE 602*a*, in some aspects, may revoke, at 616, access for the disinforming actor (e.g., UE 604 or component of UE 604) to at least one service entity or service provided by a service entity. In some aspects, the at least one service is associated with a service entity that provides a set of wireless communication services including the at least one service and a second service and revoking the access to the at least one service comprises (1) revoking access to the at least one service (e.g., a ML-based feature extraction, recommendation, or prediction for improving communication provided by the at least one service entity) in the at least one context (e.g., a revocation associated with specific locations, types of input data, or other conditions that may be associated with providing disinformation) and (2) not revoking separate access to the second service. In some aspects, revoking, at 616, the access may include associating the ID 614 of the one or more wireless devices with an identifier of an entity providing the at least one service in one of a list, a database, a blockchain, or a data structure for maintaining information regarding network actors for which access to one or more services has been revoked.

The NE 602*a* may output (or transmit), and SE 606 and UE 604 may obtain (or receive), an access revocation 618A and an access revocation 618B, respectively. The access revocation 618A may indicate to the SE 606 to exclude data associated with the disinforming actor (e.g., data from a particular component, or of a particular type, identified as being disinformation) from propagation and/or processing when providing an associated service. The access revocation 618B (corresponding, in some aspects, to one of control data 518*a*, control data 518*b*, or control data 518*c*), in some aspects, may indicate to the UE 604 that at least one component of the UE 604 provides incorrect data elements for a wireless communication service. In some aspects, the UE 604, based on the indication that at least one component of the UE 604 provides incorrect data elements, may generate a second set of data elements at 620. The second set of data elements may exclude information and/or data captured by the indicated component. Generating the second set of data elements at 620, in some aspects, may include excluding the information and/or data captured by the indicated component from propagation through a local ML/AI service entity. If the incorrect information is propagated through the local ML/AI service entity, the output of the local ML/AI service entity, in some aspects, may also be excluded when generating the second set of data elements at 620. For example, for a malfunctioning image capture device (e.g., a camera), raw image data and other data based on the raw image data (e.g., a set of bounding boxes for nearby objects based on an analysis of the raw image data) may be excluded from the second set of data elements 622.

The UE 604, in some aspects, may transmit (or provide), and the NE 602a may receive (or obtain), the second set of data elements 622 (corresponding to one of data 508b or data 508c of FIG. 5) including the sensor data and/or the derived data (but excluding the information from the disinforming actor). The NE 602a may output (e.g., transmit), and the SE 606 may obtain (e.g., receive), the second set of data elements 624 (corresponding to one of data 510a, data 510b, or data 510c of FIG. 5). The SE 606 may then process, at 626, the second set of data elements 624 based on the revocation of access for the at least one service. The processing at 626, in some aspects, may include excluding information from the second set of data elements from propagation through the at least one service. In some aspects, the processing at 626 may include propagating the information (including, in some cases, the excluded information) from the second set of data elements through other services (services other than the at least one service).

The NE 602a, in some aspects, may determine, at 628, that the disinforming actor is, or will be, associated with a second network entity, e.g., NE 602b. For example, a first vUE 504a may travel from a first area C2 to one of area B1 or A2 and the RU 540c (corresponding to NE 602a) may determine that the vUE 504a is to undergo a handover (or handoff) procedure to one of RU 540b or 540c (corresponding to NE 602b), respectively. Based on the determination at 628, the NE 602a may output (or transmit), and the NE 602b may obtain (or receive), access list information 630. Access list information 630, in some aspects, may include an indication of disinforming actors (e.g., IDs of disinforming actors) and an identifier of the at least one service entity to which access is, or has been, revoked. In some aspects, the disinforming actor ID and the associated service entity, or service, IDs may be provided in one of a list, a database, a blockchain, or a data structure for maintaining information regarding network actors for which access to one or more service entities has been revoked. In some aspects, the access list information may be transmitted (e.g., between RUs 540a and 540b) through a network entity such as DU 530. In some aspects, the access list information 630 is provided on a "need-to-know" basis such that information is provided for specific UEs that are in transition from being served by a first base station (e.g., NE 602a) or network service entity (e.g. SE 606) to being served by a second base station (e.g., NE 602b) or network service entity. In some aspects, the access list information 630 may be provided based on adjacency to the network node where the access determination was first made for the disinforming actor to keep the list size manageable.

While the above has ascribed elements and/or operations (e.g., 610, 616, 618A, 618B, 624, 628, and 630) to NE 602a and elements and/or operations 612 and 626 to SE 606, the different operations may be performed by other combinations of network nodes or components of the network node 603. For example, the SE 606 may, in some aspects, be a component of the NE 602a such that many of the operations depicted are performed internal to the NE 602a (e.g., a base station including communication components for communicating with the UE 604 and service components performing analysis of data received from multiple UEs including UE 604). Additionally, while the above discussion has been in terms of wireless communication relating to base stations (e.g., RUs, NEs, SEs), UEs, and vUEs, the data exchange, disinforming actor identification, and access revocation for one or more services may be used in other contexts using data collected from multiple actors to develop and/or determine the state of an environment to improve an industrial process, device coordination, communication, or other aspect of a system using methods in accordance with some aspects of the disclosure.

Figure 7:
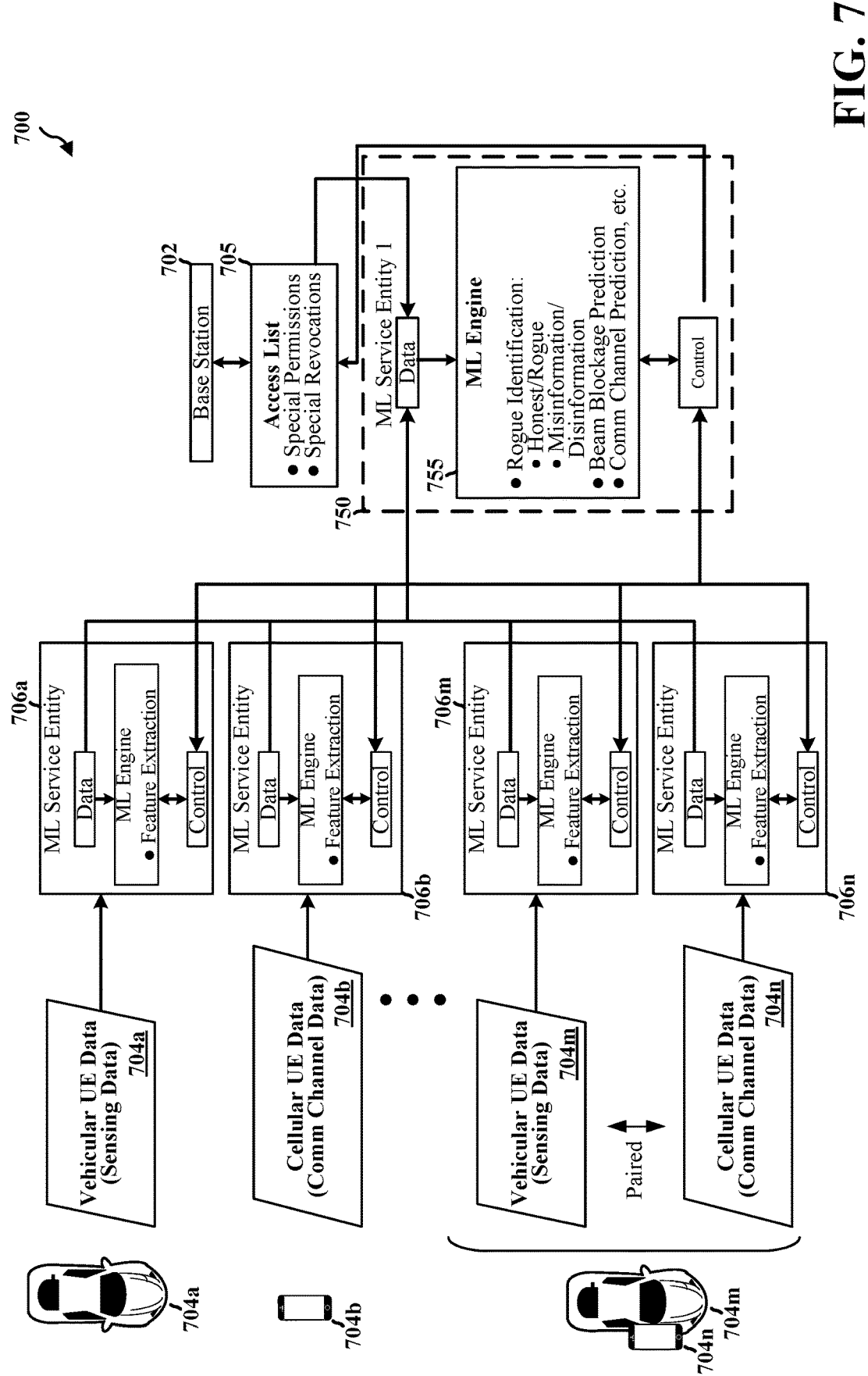
FIG. 7 is a diagram illustrating the elements of a system in accordance with some aspects of the disclosure.

FIG. 7 is a diagram 700 illustrating the elements of a system in accordance with some aspects of the disclosure. Diagram 700 illustrates that a base station 702 (e.g., a gNB or other type of base station) may maintain an access list 705 indicating a set of special permissions and set of special revocations (e.g., based on the identification of disinforming actors). In some aspects, the set of special permissions may include access to additional services when requested by the network. For example, vehicles or cellular UEs with additional capabilities such as additional memory, higher frame rate, and/or higher processing speeds may be given access to additional services when they are requested by the network to utilize the additional capabilities of the vehicles and/or cellular UEs (e.g., the higher frame rate, higher processing speeds, etc.) which could be permanent. An example application may include vehicles with a high number of in-vehicle cellular UEs, vehicles or pedestrians that move in a small area for a long period of time and retain a long-term history, or other situations may be associated with the set of special permissions. In some aspects, the set of special revocations may include a set of "permanent" revocations for disinforming actors and a set of "temporary" revocations for misinforming actors that may be updated based on a set of criteria identified at the time of the revocation. Base station 702, in some aspects, may correspond to one of the RUs 540a-540d of FIG. 5 or to one of the NEs 602a or 602b of FIG. 6. Although aspects presented herein are not limited to a vehicular setting, FIG. 7 illustrates an example in which vehicular UEs and non-vehicular UEs provide information to the network.

The base station may be associated with a network service entity 750 that includes an ML engine 755 that may obtain data from a set of UEs and vUEs including vUE 704a, UE 704b, paired vUE 704m, paired UE 704n, and/or other similar UEs. The ML engine 755 may provide one or more analyses of the data based on one or more AI/ML component algorithms or non-AI/ML algorithms. For example, the ML engine 755 may provide rogue identification as described in relation to SE 606 of FIG. 6 to identify an actor as one of an honest actor or a rogue actor and associated data as one of correct, misinformation, or disinformation. Additional services and/or analyses may include beam blockage prediction, communication channel prediction, or other analysis of the current or predicted state of the system. Based on the analyses, the ML engine 755 may provide control commands or control data to the base station 702 and/or the vUEs 704a through 704m and UEs 704b through 704n including updated rogue actor, or disinforming actor, identification as described in relation to operation 612 and transmission of the ID 614 of FIG. 6.

As discussed above in relation to FIGS. 5 and 6, the vUEs 704a through 704m may be associated with a set of sensors that collect sensing data. The sensing data may include data regarding a physical environment such as image data from a camera, RADAR data, LIDAR data, or other environmental data. The sensing data, in some aspects, may include location data from a GPS and/or GNSS and speed data from an IMU. Additional, or alternative, sensing data may be included in some aspects. UEs 704b through 704n (and vUEs 704a through 704m), in some aspects, may be associated with a set of sensors collecting sensing data. In some aspects, the sensing data may be related to one or more communication channels. For example, the sensing data may include measurements of a signal strength or quality such as a RSRP or a RSRQ associated with one or more beam directions, a current beam direction, or other communication channel characteristics. The sensing data collected by the UEs 704b through 704n may, in some aspects, include location data from a GPS and/or speed data from an IMU.

As discussed above in relation to FIGS. 5 and 6, the vUEs 704a through 704m and/or the UEs 704b through 704n may be associated with local ML service entity 706a through 706m and/or 706b through 706n, respectively. A local ML service entity 706a through 706n may be implemented by a processor associated with the corresponding vUE or UE. The local ML service entity 706a through 706n may receive sensing data and process the data to perform a feature extraction or other analysis based on the data collected by the corresponding vUE or UE. Generally, in addition to the output of local ML service entity, the feature extraction outputs may refer to the outputs of any ML-based or non-ML-based algorithms that identify salient features of, or from, the raw data. The local ML service entity 706a through 706n may produce data for inclusion in a set of data elements. Based on a first set of data elements provided to the ML engine 755, the vUE, the UE, or the local ML service entity may receive control data indicating that a particular sensor is no longer to be used to produce data (e.g., that raw data from the particular sensor is not to be provided to the ML engine 755 and/or that the data from the sensor is not to be processed and/or propagated for one or more analyses). Accordingly, the indicated data may not be used to generate a second set of data elements provided by the vUE, the UE, and/or the local ML service entity to the base station 702 and/or the ML engine 755.

Figure 8:
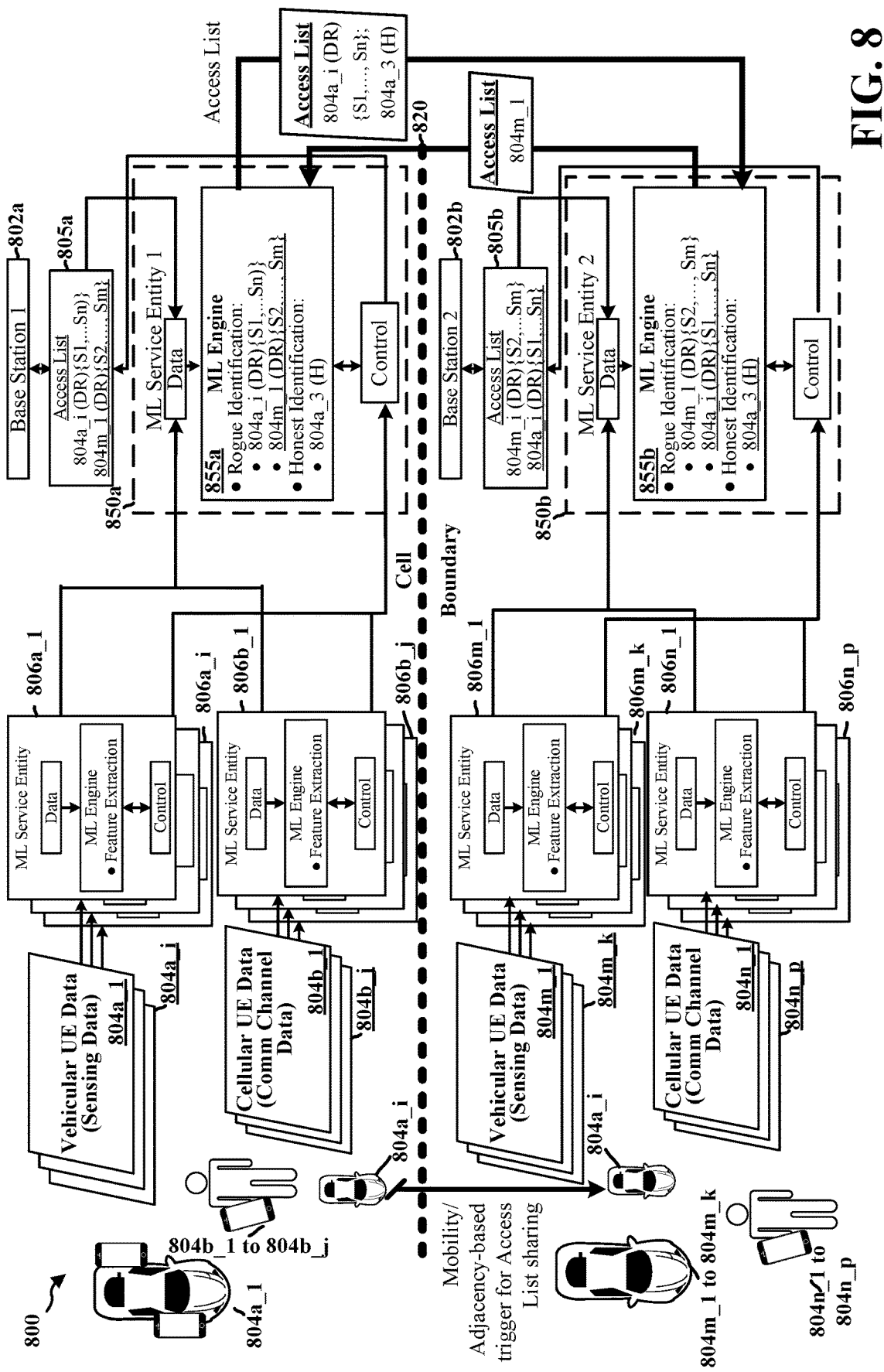
FIG. 8 is a diagram illustrating a first ML service entity associated with a first base station providing access list information to a second ML service entity associated with a second base station in accordance with some aspects of the disclosure.

FIG. 8 is a diagram 800 illustrating a first ML service entity 850a associated with a first base station 802a providing access list information to a second ML service entity 850b associated with a second base station 802b in accordance with some aspects of the disclosure. In some aspects, the ML service entities (e.g., 850a and 850b) may be hosted on a same server. Alternatively, the ML service entities (e.g., 850a and 850b) may be hosted on different servers. FIG. 8 illustrates an example with vehicular UEs and non-vehicular UEs to the illustrate the concept, although aspects presented herein may be applied for any UEs and is not limited to the examples of UEs provided in FIG. 8. The first ML service entity 850a and base station 802a may be associated with a set of vUEs including vUEs 804a_1 through 804a_i and vUEs 804m_1 through 804m_k and a set of UEs including UE 804b_1 through 804b_j, and UE 804n_1 through 804n_p. The UE 804b_1 to 804b_j and/or a UE from 804n_1 to 804n_p, in some aspects, may be handheld wireless devices associated with a user that may be associated with a vUE (e.g., as a passenger) or may be unassociated with a vUE (e.g., a pedestrian).

Diagram 800 illustrates that a base station 802a (e.g., a gNB or other base station) may maintain an access list 805a indicating a set of special permissions (as described above in relation to FIG. 7) and set of special revocations (e.g., based on the identification of disinforming actors). In some aspects, the set of special revocations may include a set of "permanent" revocations for disinforming actors and a set of "temporary" revocations for misinforming actors that may be updated based on a set of criteria identified at the time of the revocation. For example, the access lists 805a and 805b may include an indication that the vUE 804a_i and the vUE 804m_1 have been classified and/or identified as a disinforming rogue actor. Diagram 800 indicates by the underlining that vUE 804a_i and vUE 804m_1 have been added to access lists 805b and 805a (and ML engines 855b and 855a), respectively, based on information (e.g., an access list or synchronization message) from another network entity (e.g., ML engine 855a and ML engine 855b, respectively). In some aspects, the ML engine 855a may further identify and/or classify a vUE 804a_3 in the set of vUEs 804a_1 to 804a_i as a non-rogue, or honest, actor. The identification may be stored locally and communicated to ML engine 855b based on the ML engine 855b being associated with a neighboring cell. Base station 802a, in some aspects, may correspond to one of the RUs 540a-540d of FIG. 5 or to the NE 602a of FIG. 6.

The base station may be associated with a ML service entity 850a that includes a ML engine 855a that may obtain data from a set of UEs and vUEs including vUE 804a_1 to 804a_i and UE 804b_1 to 804b_j. The ML engine 855a may provide one or more analyses of the data. For example, the ML engine 855a may provide rogue identification as described in relation to SE 606 of FIG. 6 to identify an actor as one of an honest actor or a rogue actor and associated data as one of correct, misinformation, or disinformation. For example, the ML engine 855a or 855b may identify and/or classify the vUE 804a_i or the vUE 804m_1, respectively, as a disinforming rogue actor. A network entity or network node (e.g., an ML engine such as ML engine 855a or 855b or an associated base station such as base station 802a or 802b) that initially classifies an actor as a rogue actor may be referred to as a discovering network entity or network node. Additional services and/or analyses may include beam blockage prediction, communication channel prediction, or other analysis of the current or predicted state of the system. Based on the analyses, the ML engine 855a may provide control commands or control data to the base station 802a and/or the vUEs 804a_1 to 804a_i and UE from 804b_1 to 804b_j including updated rogue actor, or disinforming actor, identification as described in relation to operation 612 and the transmission of the ID 614 of FIG. 6.

As discussed above in relation to FIGS. 5 and 6, the vUEs 804a_1 to 804a_i through 804m_1 to 804m_k may be associated with a set of sensors that collect sensing data. The sensing data may include data regarding a physical environment such as image data from a camera, RADAR data, LIDAR data, or other environmental data. The sensing data, in some aspects, may include location data from a GPS and/or GNSS and speed data from an IMU. Additional, or alternative, sensing data may be included in some aspects. UEs 804b_1 to 804b_j through 804n_1 to 804n_p (and vUEs 804a_1 to 804a_i through 804m_1 to 804m_k), in some aspects, may be associated with a set of sensors collecting sensing data. In some aspects, the sensing data may be related to one or more communication channels. For example, the sensing data may include measurements of a signal strength or quality such as a RSRP or a RSRQ associated with one or more beam directions, a current beam direction, or other communication channel characteristics. The sensing data collected by the UEs 804b_1 to 804b_j through 804n_1 to 804n_p may, in some aspects, include location data from a GPS and/or speed data from an IMU.

As discussed above in relation to FIGS. 5 and 6, the vUEs 804*a*_1 to 804*a*_i and 804*m*_1 to 804*m*_k and/or the UEs 804*b*_1 to 804*b*_j and 804*n*_1 to 804*n*_p may be associated with a corresponding local ML service entity 806*a*_1 to 806*a*_i and 806*m*_1 to 806*m*_k and/or 806*b*_1 to 806*b*_j and 806*n*_1 to 806*n*_p, respectively. A local ML service entity 806*a*_1 to 806*a*_i through 806*n*_1 to 806*n*_p may be implemented by a processor associated with the corresponding vUE or UE. The local ML service entity 806*a*_1 to 806*a*_i through 806*n*_1 to 806*n*_p may receive sensing data and process the data to perform a feature extraction or other analysis based on the data collected by the corresponding vUE or UE. The local ML service entity 806*a*_1 to 806*a*_i through 806*n*_1 to 806*n*_p may produce data for inclusion in a set of data elements. Based on a first set of data elements provided to the ML engine 855*a* (or 855*b*), the vUE, the UE, or the local ML service entity may receive control data indicating that a particular sensor is no longer to be used to produce data (e.g., that raw data from the particular sensor is not to be provided to the ML engine 855*a* (or 855*b*) and/or that the data from the sensor is not to be processed and/or propagated for one or more analyses). Accordingly, the indicated data may not be used to generate a second set of data elements provided by the vUE, the UE, and/or the local ML service entity to the base station 802*a* (or 802*b*) and/or the ML engine 855*a* (or 855*b*).

As illustrated, at least vUE 804*a*_i may cross a cell boundary 820 such that the vUE becomes one of the vUE 804*m*_1 to vUE 804*m*_k and, after crossing the cell boundary, is served by (or associated with) the base station 802*b* and the ML service entity 850*b* instead of the first ML service entity 850*a* and base station 802*a*. If a UE or vUE (e.g., vUE 804*a*_i as an example of a vUE joining the group of vUEs 804*m*_1 to 804*m*_k) was determined to be a disinforming rogue actor (or to include a disinforming actor) by base station 802*a* or ML service entity 850*a*, the ML service entity 850*a* may provide access (list) information regarding the UE (e.g., vUE 804*a*_i) to ML service entity 850*b*. For example, the ML service entity 850*a* may provide, to the ML service entity 850*b*, an ID of the UE (e.g., vUE 804*a*_i) (or an ID of the component of vUE) and a set of IDs (e.g., a set of service IDs {S1, . . . , Sn}) for services for which the vUE (or the component of the vUE) has been determined to be a disinforming actor. The access list information may be provided as described in relation to FIG. 6 above. For example, in some aspects, the access list information 630 may be provided based on adjacency to the network node where the access determination was first made for, or triggered by mobility of, the disinforming actor (e.g., transferring information regarding vUE 804*a*_3 and 804*m*_1 based on adjacency and information regarding vUE 804*a*_i based on mobility) to keep the list size manageable. Based on the received access list information, the ML service entity 850*b* (or base station 802*b*) may update an access list 805*b* and then process subsequently received sets of data elements from the UE (e.g., vUE 804*m*_1 to 804*m*_k) by excluding certain information from processing and/or propagation for an indicated set of one or more services or in a set of one or more contexts (e.g., the set of contexts and/or services {S2, . . . , Sm} for vUE 804*m*_1).

In some aspects, a network node (e.g., base station 802*a* or 802*b*, ML service entity 850*a* or 850*b*, or ML engine 855*a* or 855*b*) may employ methods to purge and/or prune a local access list (e.g., access list 805*a* or 805*b*). The methods for purging and/or pruning the local access list may be based on, in some aspects, a least recently used entry, a least frequently used entry, or other factors. In some aspects, a network node may apply different rules for purging and/or pruning a local access list of actors for which the network node is a discovering network node, such as maintaining the actor on the access list until a reason for the classification has been resolved (e.g., a tampered component is replaced).

Figure 9:
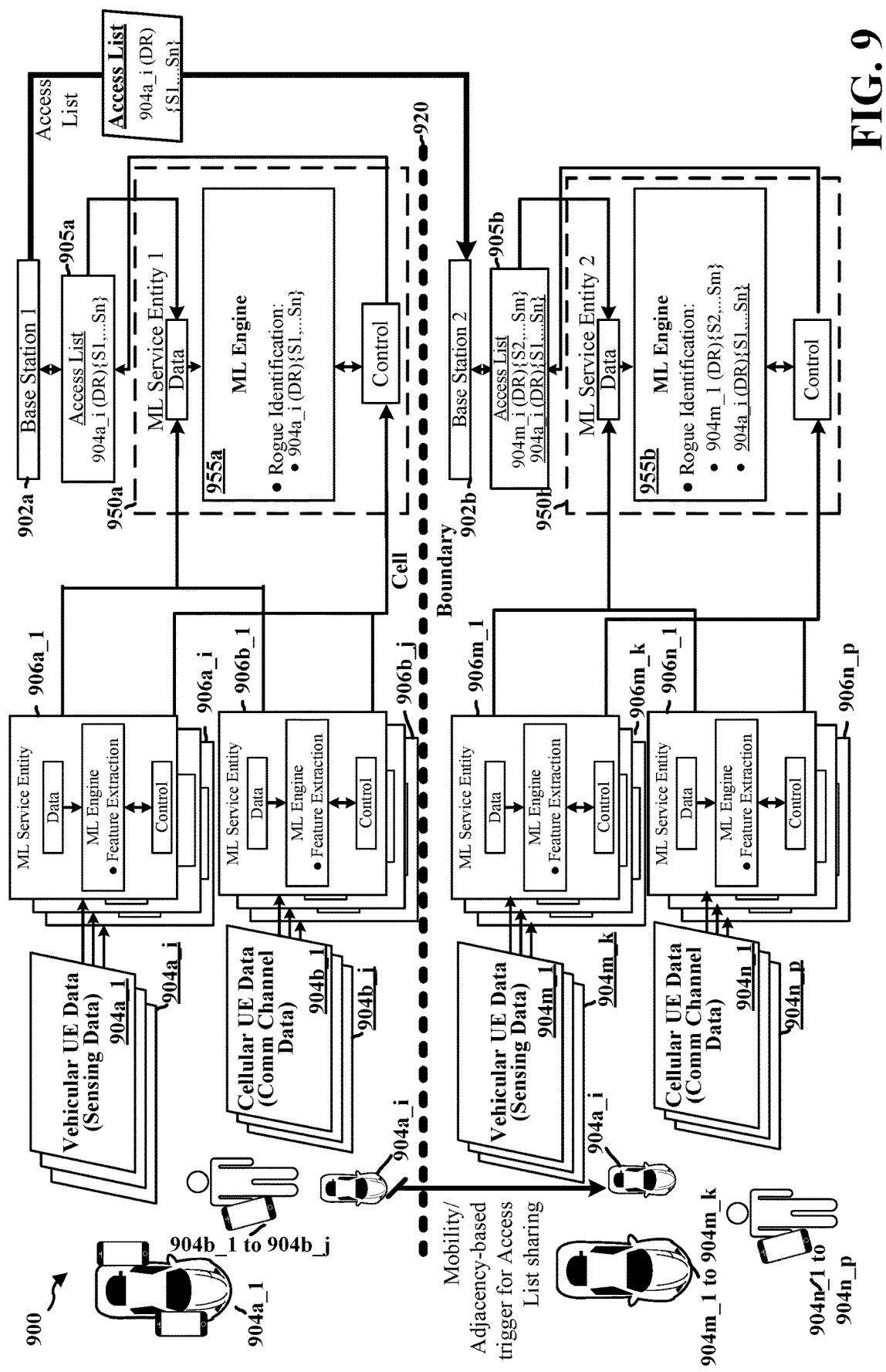
FIG. 9 is a diagram illustrating first base station associated with a first ML service entity providing access list information to a second base station associated with a second ML service entity in accordance with some aspects of the disclosure.

FIG. 9 is a diagram 900 illustrating first base station 902*a* associated with a first ML service entity 950*a* providing access list information to a second base station 902*b* associated with a second ML service entity 950*b* in accordance with some aspects of the disclosure. In some aspects, the ML service entities (e.g., 950*a* and 950*b*) may be hosted on a same server. Alternatively, the ML service entities (e.g., 950*a* and 950*b*) may be hosted on different servers. FIG. 9 illustrates an example with vehicular UEs and non-vehicular UEs to the illustrate the concept, although aspects presented herein may be applied for any UEs and is not limited to the examples of UEs provided in FIG. 9. The first ML service entity 950*a* and base station 902*a* may be associated with a set of vUEs including vUEs 904*a*_1 to 904*a*_i and vUEs 904*m* and a set of UEs UE 904*b*_1 to 904*b*_j.

Diagram 900 illustrates that a base station 902*a* (e.g., a gNB or other base station) may maintain an access list 905*a* indicating a set of special permissions (as described in relation to FIG. 7) and set of special revocations (e.g., based on the identification of disinforming actors). In some aspects, the set of special revocations may include a set of "permanent" revocations for disinforming actors and a set of "temporary" revocations for misinforming actors that may be updated based on a set of criteria identified at the time of the revocation. For example, the access list 905*a* may include an indication that the vUE 904*a*_i (and access list 905*b* may include an indication that the vUE 904*m*_1) has been classified and/or identified as a disinforming rogue actor. Base station 902*a*, in some aspects, may correspond to one of the RUs 540*a*-540*d* of FIG. 5 or to the NE 602*a* of FIG. 6.

The base station may be associated with a ML service entity 950*a* that includes a ML engine 955*a* that may obtain data from a set of UEs and vUEs including vUE 904*a*_1 to 904*a*_i and UE 904*b*_1 to 904*b*_j. The ML engine 955*a* may provide one or more analyses of the data. For example, the ML engine 955*a* may provide rogue identification as described in relation to SE 606 of FIG. 6 to identify an actor as one of an honest actor or a rogue actor and associated data as one of correct, misinformation, or disinformation. For example, the ML engine 955*a* or 955*b* may identify and/or classify the vUE 904*a*_i or the vUE 904*m*_1, respectively, as a disinforming rogue actor. Additional services and/or analyses may include beam blockage prediction, communication channel prediction, or other analysis of the current or predicted state of the system. Based on the analyses, the ML engine 955*a* may provide control commands or control data to the base station 902*a* and/or the vUEs 904*a*_1 to 904*a*_i and UE 904*b*_1 to 904*b*_j, which may include updated rogue actor, or disinforming actor, identification as described in relation to operation 612 and the transmission of the ID 614 of FIG. 6.

As discussed above in relation to FIGS. 5 and 6, the vUEs 904*a*_1 to 904*a*_i through 904*m*_1 to 904*m*_k may be associated with a set of sensors that collect sensing data. The sensing data may include data regarding a physical environment such as image data from a camera, RADAR data, LIDAR data, or other environmental data. The sensing data, in some aspects, may include location data from a GPS and/or GNSS and speed data from an IMU. Additional, or alternative, sensing data may be included in some aspects. UEs 904*b*_1 to 904*b*_j through 904*n*_1 to 904*n*_p (and vUEs 904*a*_1 to 904*a*_i through 904*m*_1 to 904*m*_k), in some aspects, may be associated with a set of sensors collecting sensing data. In some aspects, the sensing data may be related to one or more communication channels. For example, the sensing data may include measurements of a signal strength or quality such as a RSRP or a RSRQ associated with one or more beam directions, a current beam direction, or other communication channel characteristics. The sensing data collected by the UEs 904*b*_1 to 904*b*_j through 904*n*_1 to 904*n*_p may, in some aspects, include location data from a GPS and/or speed data from an IMU.

As discussed above in relation to FIGS. 5 and 6, the vUEs 904*a*_1 to 904*a*_i and 904*m*_1 to 904*m*_k and/or the UEs 904*b*_1 to 904*b*_j and 904*n*_1 to 904*n*_p may be associated with a corresponding local ML service entity 906*a*_1 to 906*a*_i and 906*m*_1 to 906*m*_k and/or 906*b*_1 to 906*b*_j and 906*n*_1 to 906*n*_p, respectively. A local ML service entity 906*a*_1 to 904*a*_i through 906*n*_1 to 904*n*_p may be implemented by a processor associated with the corresponding vUE or UE. The local ML service entity 906*a*_1 to 906*a*_i through 906*n*_1 to 906*n*_p may receive sensing data and process the data to perform a feature extraction or other analysis based on the data collected by the corresponding vUE or UE. The local ML service entity 906*a*_1 to 906*a*_i through 906*n*_1 to 906*n*_p may produce data for inclusion in a set of data elements. Based on a first set of data elements provided to the ML engine 955*a* (or 955*b*), the vUE, the UE, or the local ML service entity may receive control data indicating that a particular sensor is no longer to be used to produce data (e.g., that raw data from the particular sensor is not to be provided to the ML engine 955*a* (or 955*b*) and/or that the data from the sensor is not to be processed and/or propagated for one or more analyses). Accordingly, the indicated data may not be used to generate a second set of data elements provided by the vUE, the UE, and/or the local ML service entity to the base station 902*a* (or 902*b*) and/or the ML engine 955*a* (or 955*b*).

As illustrated, a UE (e.g., vUE 904*a*_i transitioning from the group including vUE 904*a*_1 to 904*a*_i to the group including vUE 904*m*_1 to 904*m*_k) may cross a cell boundary 920 such that the UE (e.g., vUE 904*a*_i), after crossing the cell boundary, is served by (or associated with) the base station 902*b* and the ML service entity 950*b*. If the UE (e.g., the vUE 904*a*_i) was determined to be a disinforming actor (or to include a disinforming actor) by base station 902*a* or ML service entity 950*a*, the base station 902*a* may provide access information regarding the UE (e.g., the vUE 904*a*_i) to the base station 902*b*. For example, the base station 902*a* may provide, to the base station 902*b*, an ID of the UE (e.g., the vUE 904*a*_i) (or an ID of the component of the vUE) and a set of IDs (e.g., the set of service IDs {S1, ... Sn}) for services for which the UE (e.g., the vUE 904*a*_i) (or the component of the vUE) has been determined to be a disinforming actor. The access list information may be provided as described in relation to FIG. 6 above. For example, in some aspects, the access list information 630 may be provided based on adjacency to the network node where the access determination was first made for the disinforming actor (e.g., the vUE 904*a*_i) to keep the list size manageable or may be provided based on a triggering event related to the mobility of the first wireless device. Based on the received access list information, the ML service entity 950*b* (or base station 902*b*) may update an access list 905*b* and then process subsequently received sets of data elements from the UE (e.g., the UE from vUE 904*m*_1 to 904*m*_k) by excluding certain information from processing and/or propagation for an indicated set of one or more services or in a set of one or more contexts (e.g., the set of contexts and/or services {S2, . . . , Sm} for vUE 904*m*_1).

Figure 10:
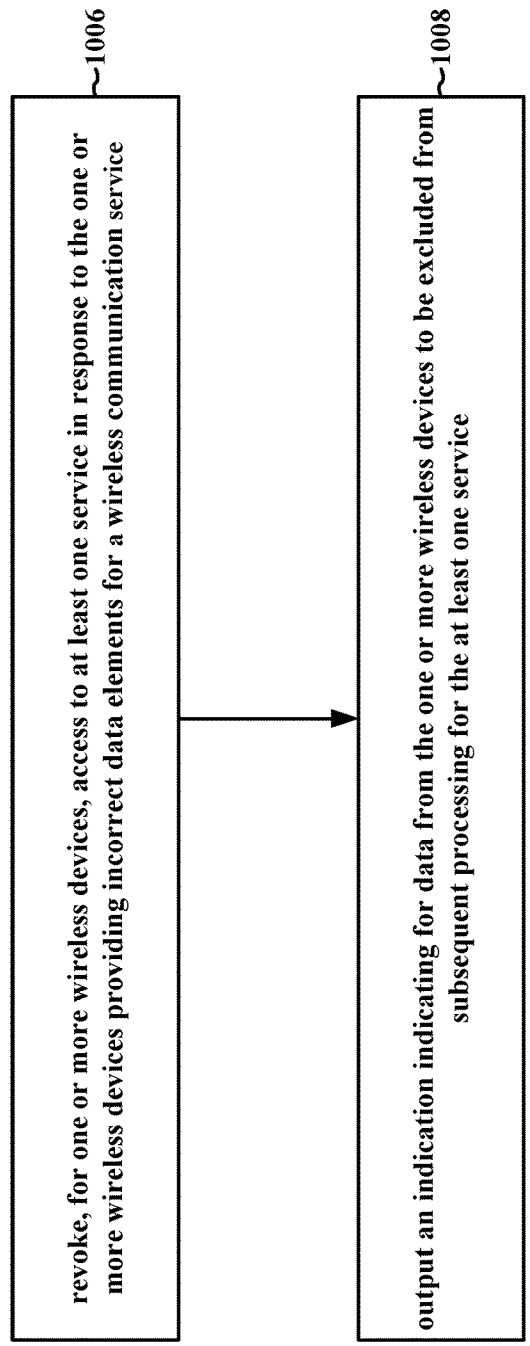
FIG. 10 is a flowchart of a method of wireless communication.

FIG. 10 is a flowchart 1000 of a method of wireless communication. The method may be performed by a base station or other network entity (e.g., the base station 102, 702, 802*a*, 802*b*, 902*a*, or 902*b*; the RU 540*a*, 540*b*, 540*c*, or 540*d*; the NE 602*a* or 602*b*; the network entity 1502 or 1660). The base station may receive a first set of data elements from a first wireless device in a set of one or more wireless devices. The first set of data elements may, in some aspects, be based on information from one or more of a RADAR sensor, a LIDAR sensor, a camera, a GNSS, a GPS, or an IMU. The first set of data elements, in some aspects, may include data generated by a local ML service entity at the first wireless device. For example, referring to FIGS. 5-9, a NE 602*a*, or base station 702, 802*a*, or 902*a* (or RU 540*c*) may receive a first set of data elements 608 from a UE 604 (e.g., a UE 704*b*, vUE 504*a*, 704*m*, 804*m*_1 to 804*m*_k, or 904*m*_1 to 904*m*_k) generated by a set of sensors and/or a local ML service entity (e.g., local ML service entity 706*b*, 506*a*, 706*a*, 806*m*_1 to 806*m*_k, or 906*a* a_1 to 906*a*_i, respectively), associated with the UE 604 (e.g., UE 704*b*, vUE 504*a*, 704*m*, 804*m*_1 to 804*m*_k, or 904*m*_1 to 904*m*_k).

The base station may identify the first wireless device of the one or more wireless devices as providing incorrect data elements based on the first set of data elements. In some aspects, the identification may be performed by at least one of a ML component algorithm and a non-ML component algorithm, e.g., one or more GANs or VAEs. The at least one of the ML component algorithms and the non-ML component algorithms, in some aspects, may include at least one of a first component algorithm trained to detect fabricated data elements, a second component algorithm trained to detect altered data elements, a third component algorithm trained to detect one or more of duplicated and/or imitated data elements, or a fourth component algorithm trained to detect delayed reports of data elements. As discussed above, in some aspects, detection of intentional tampering by a disinforming rogue actor may be identified and/or detected by a combination of AI/ML and non-AI/ML algorithms trained to detect evidence of tampering from the incoming sensing and other quantitative data. Identifying the first wireless device as providing incorrect data elements, in some aspects, may include identifying, with a threshold probability, that subsequent sets of data elements obtained from the first wireless device are likely to include incorrect data elements until a change to the internal conditions and operation of the first wireless device while the context and the service remain unchanged (e.g., for a first time period). The identification that the subsequent sets of data elements are likely to include incorrect data elements, in some aspects, may include identifying that the likely incorrect data elements are in a form detectable by the combination of AI/ML and non-AI/ML algorithms trained to detect evidence of tampering from the incoming sensing and other quantitative data. In some aspects, identifying the first wireless device of the one or more wireless devices as providing incorrect data elements may include at least one of identifying that the first wireless device is configured to provide incorrect data elements or that the first wireless device is associated with at least one malfunctioning sensor from which the incorrect data elements are derived. The first time period, in some aspects, may include a time period until a malfunctioning sensor (e.g., the disinforming actor) is replaced. For example, referring to FIGS. 5-9, the SE 606 (e.g., network service entity 550*a*, 750, 850*a*, 950*a*) associated with the NE 602*a* may identify, at 612, a first UE 604 (e.g., a vUE 504*a*, 704*m*, 804*m*_1 to 804*m*_k, or 904*m*_1 to 904*m*_k, respectively) or a component of the UE 604 as a disinforming actor based on the first set of data elements 608 (or 610).

At 1006, the base station may revoke, for one or more wireless devices, access to at least one service for at least one context in response to the one or more wireless devices providing incorrect data elements for a wireless communication service. For example, 1006 may be performed by CU processor 1512, DU processor 1532, RU processor 1542, network processor 1612, or disinformation mitigation component 199 of FIG. 15 or 16. In some aspects, the at least one service may be associated with a service entity that provides a set of wireless communication services including at least the at least one service and a second service and revoking the access to the at least one service, at 1006, includes (1) revoking access to the at least one service in the at least one context and (2) not revoking access to the second service. Revoking the access to the at least one service at 1006, in some aspects, may include associating an identifier of the one or more wireless devices with an identifier of an entity providing the at least one service in one of a list, a database, a blockchain, or a data structure for maintaining information regarding network actors for which access to one or more services has been revoked. For example, referring to FIGS. 5-9, the NE 602*a*, or base station 702, 802*a*, or 902*a* (or RU 540*c*) may revoke access for the disinforming actor (e.g., the UE 604 and/or the component of the UE 604) for at least one service.

At 1008, the base station may output an indication for data from the one or more wireless devices to be excluded from subsequent processing for the at least one service in the at least one context. For example, 1008 may be performed by CU processor 1512, DU processor 1532, RU processor 1542, transceiver(s) 1546, antenna(s) 1580, network interface 1680, network processor 1612, or disinformation mitigation component 199 of FIG. 15 or 16. The indication output at 1008 may indicate to one or more associated service entities (and the respective vUEs) to exclude data associated with the disinforming actor (e.g., data from a particular component, or of a particular type, identified as being disinformation) from propagation and/or processing when providing an associated service. For example, referring to FIGS. 5-9, the NE 602*a*, or base station 702, 802*a*, or 902*a* (or RU 540*c*) may output, and a SE 606 (e.g., network service entity 550*a*, 750, 850*a*, 950*a*) may receive, access revocation 618A indicating to the SE 606 to exclude data associated with the disinforming actor (e.g., data from a particular component, or of a particular type, identified as being disinformation) from propagation and/or processing when providing an associated service.

The base station may transmit, for the first wireless device, an indication of the at least one disinforming actor (e.g., a malfunctioning sensor). Based on the indication, the first wireless device, in some aspects, may omit data elements derived from an output of the at least one disinforming actor (e.g., malfunctioning sensor) in at least one subsequent set of data elements. Accordingly, the base station may receive at least one subsequent set of data elements associated with the first wireless device omitting an output of the at least one malfunctioning sensor based on the indication of the at least one malfunctioning sensor. In some aspects, the indication may include additional indications of a set of contexts, or a set of services, for which the information associated with the disinforming actor is to be omitted (and, by implication, contexts or services for which the information associated with the disinforming actor may be included in a subsequent set of data elements). For example, referring to FIGS. 5-9, the NE 602*a* (e.g., the network service entity 550*a* or the ML engines 755, 855*a*, 955*a* associated with an RU 540*c*, or base station 702, 802*a*, or 902*b*, respectively) may transmit an access revocation 618B to a UE 604 (e.g., the vUE 504*a*, 704*m*, 804*m*_1 to 80*m*_k, or 904*m*_1 904*m*_k, respectively) indicating an identity of a disinforming actor and a set of associated services and/or contexts for which the UE 604 is identified at 612 as a disinforming actor.

Finally, the base station may provide, to a second network node, information regarding the one or more wireless devices identified as providing incorrect data elements. In some aspects, the second network node is a network node geographically adjacent to the first network node. In some aspects, the base station may provide the information to geographically adjacent network cells, or network nodes corresponding to a change in the network entity identifying the incorrect data elements or a change in the network entity storing the access information.

For example, referring to FIGS. 5-9, the NE 602*a*, or base station 802*a*, or 902*a* (or RU 540*c*) may provide access list information 630 relating to the UE 604 (e.g., vUE 804*m*_1 to 804*m*_k, 904*m*_1 to 904*m*_k, or 504*a*) to NE 602*b*, or base station 802*b*, or 902*b* (or RU 540*a* or 540*b*) based on a crossing of a cell boundary (e.g., a boundary between area C2 and B1 or A2, or crossing a boundary 820 or 920).

Figure 11:
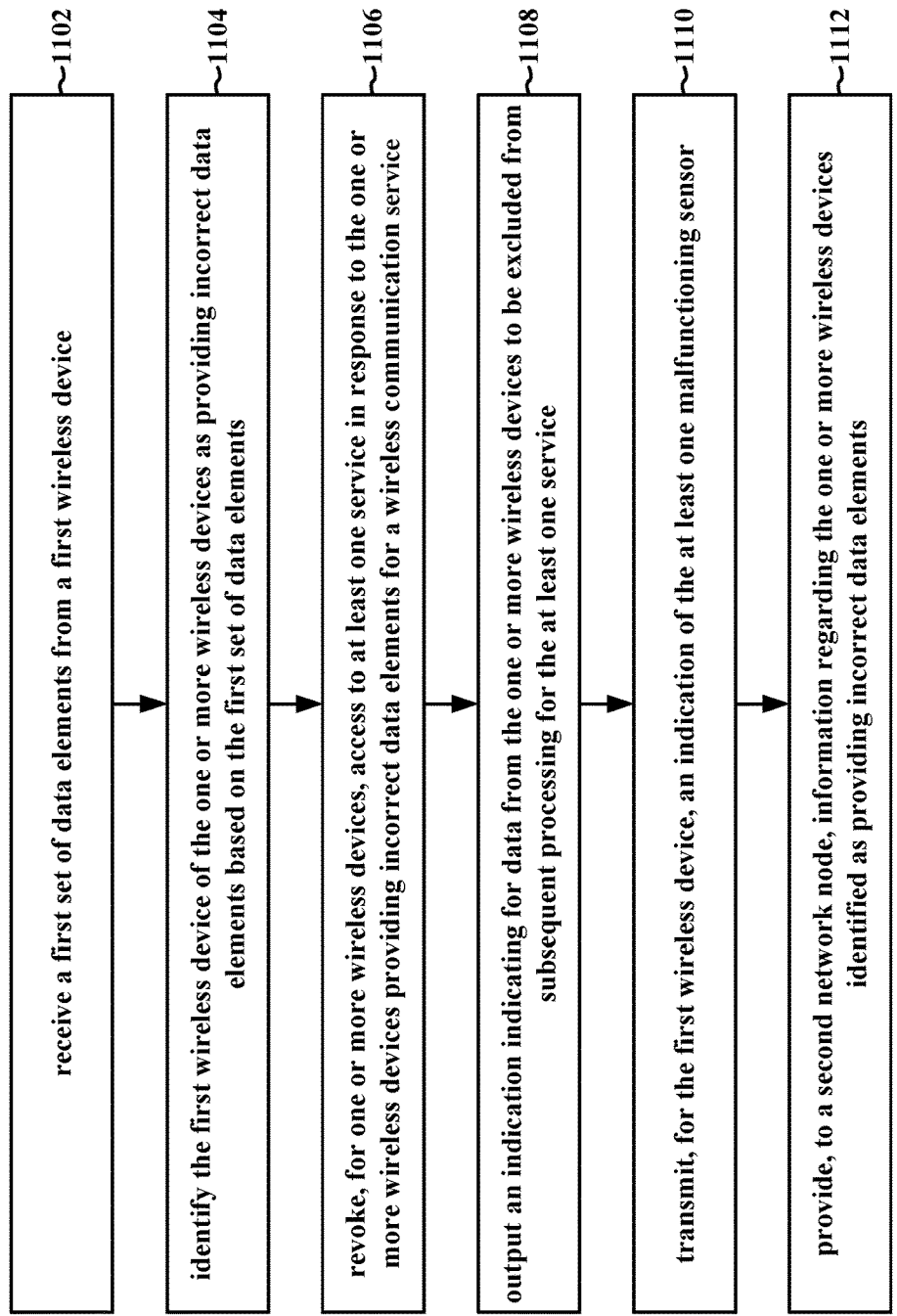
FIG. 11 is a flowchart of a method of wireless communication.

FIG. 11 is a flowchart 1100 of a method of wireless communication. The method may be performed by a base station or other network entity (e.g., the base station 102, 702, 802*a*, 802*b*, 902*a*, or 902*b*; the RU 540*a*, 540*b*, 540*c*, or 540*d*; the NE 602*a* or 602*b*; the network entity 1502 or 1660). At 1102, the base station may receive a first set of data elements from a first wireless device in a set of one or more wireless devices. For example, 1102 may be performed by CU processor 1512, DU processor 1532, RU processor 1542, transceiver(s) 1546, antenna(s) 1580, network interface 1680, network processor 1612, or disinformation mitigation component 199 of FIG. 15 or 16. The first set of data elements may, in some aspects, be based on information from one or more of a RADAR sensor, a LIDAR sensor, a camera, a GNSS, a GPS, or an IMU. The first set of data elements, in some aspects, may include data generated by a local ML service entity at the first wireless device. For example, referring to FIGS. 5-9, a NE 602*a*, or base station 702, 802*a*, or 902*a* (or RU 540*c*) may receive a first set of data elements 608 from a UE 604 (e.g., a UE 704*b*, vUE 504*a*, 704*m*, 804*m*_1 to 804*m*_k, or 904*m*_1 to 904*m*_k) generated by a set of sensors and/or a local ML service entity (e.g., local ML service entity 706*b*, 506*a*, 706*a*, 806*m*_1 to 806*m*_k, or 906*a*_1 to 906*a*_i, respectively), associated with the UE 604 (e.g., UE 704*b*, vUE 504*a*, 704*m*, 804*m*_1 to 804*m*_k, or 904*m*_1 to 904*m*_k).

At 1104, the base station may identify the first wireless device of the one or more wireless devices as providing incorrect perception data based on the first set of data elements. For example, 1104 may be performed by CU processor 1512, DU processor 1532, RU processor 1542, network processor 1612, or disinformation mitigation component 199 of FIG. 15 or 16. In some aspects, the identification at 1104 may be performed by at least one of a ML component algorithm and a non-ML component algorithm, e.g., one or more GANs or VAEs. The at least one of the ML component algorithms and the non-ML component algorithms, in some aspects, may include at least one of a first component algorithm trained to detect fabricated data elements, a second component algorithm trained to detect altered data elements, a third component algorithm trained to detect one or more of duplicated and/or imitated data elements, or a fourth component algorithm trained to detect delayed reports of data elements. As discussed above, in some aspects, detection of intentional tampering by a disinforming rogue actor may be identified and/or detected by a combination of AI/ML and non-AI/ML algorithms trained to detect evidence of tampering from the incoming sensing and other quantitative data. Identifying the first wireless device as providing incorrect data elements at 1104, in some aspects, may include identifying, with a threshold probability, that subsequent sets of data elements obtained from the first wireless device are likely to include incorrect data elements until a change to an identifiable combination of internal and external conditions of the first wireless device (e.g., for a first time period). As an example, in addition to distinguishing between honest and rogue information or devices, a distinction may be made between misinformation and disinformation. For misinformation, other UEs in the same environment, that have received the same configuration from the network may send incorrect values for the same data element with the same non-zero probability. For disinformation, there may be other UEs in the same environment that have received the same configuration from the network, and which send incorrect values for the same data element with a different probability, e.g., with a 0 probability. Identifying the first wireless device as providing incorrect data elements at 1104, in some aspects, may include identifying, with a threshold probability, that subsequent sets of data elements obtained from the first wireless device are likely to include incorrect data elements until a change to the internal conditions and operation of the first wireless device while the context and the service remain unchanged. The identification that the subsequent sets of data elements are likely to include incorrect data elements, in some aspects, may include identifying that the likely incorrect data elements are in a form detectable by the combination of AI/ML and non-AI/ML algorithms trained to detect evidence of tampering from the incoming sensing and other quantitative data. The first time period, in some aspects, may include a time period until a malfunctioning sensor (e.g., the disinforming actor) is replaced. In some aspects, identifying the first wireless device of the one or more wireless devices as providing incorrect data elements may include at least one of identifying that the first wireless device is configured to provide incorrect data elements or that the first wireless device is associated with at least one malfunctioning sensor from which the incorrect data elements are derived. For example, referring to FIGS. 5-9, the SE 606 (e.g., network service entity 550*a*, 750, 850*a*, 950*a*) associated with the NE 602*a* may identify, at 612, a first UE 604 (e.g., a vUE 504*a*, 704*m*, 804*m*_1 to 804*m*_k, or 904*m*_1 to 904*m*_k, respectively) or a component of the UE 604 as a disinforming actor based on the first set of data elements 608 (or 610).

At 1106, the base station may revoke, for one or more wireless devices including the first wireless device, access to at least one service for at least one context in response to the one or more wireless devices providing incorrect data elements for wireless communication. For example, 1106 may be performed by CU processor 1512, DU processor 1532, RU processor 1542, network processor 1612, or disinformation mitigation component 199 of FIG. 15 or 16. In some aspects, the at least one service may be associated with a service entity that provides a set of wireless communication services including at least the at least one service and a second service and revoking the access to the at least one service, at 1106, includes (1) revoking access to the at least one service in the at least one context and (2) not revoking access to the second service. Revoking the access to the at least one service at 1106, in some aspects, may include associating an identifier of the one or more wireless devices with an identifier of an entity providing the at least one service in one of a list, a database, a blockchain, or a data structure for maintaining information regarding network actors for which access to one or more services has been revoked. For example, referring to FIGS. 5-9, the NE 602*a*, or base station 702, 802*a*, or 902*a* (or RU 540*c*) may revoke access for the disinforming actor (e.g., the UE 604 and/or the component of the UE 604) for at least one service.

At 1108, the base station may output an indication for data from the one or more wireless devices to be excluded from subsequent processing for the at least one service in the at least one context. For example, 1108 may be performed by CU processor 1512, DU processor 1532, RU processor 1542, transceiver(s) 1546, antenna(s) 1580, network interface 1680, network processor 1612, or disinformation mitigation component 199 of FIG. 15 or 16. The indication output at 1108 may indicate to one or more associated service entities (or vUEs) to exclude data associated with the disinforming actor (e.g., data from a particular component, or of a particular type, identified as being disinformation) from propagation and/or processing when providing an associated service. For example, referring to FIGS. 5-9, the NE 602*a*, or base station 702, 802*a*, or 902*a* (or RU 540*c*) may output, and a SE 606 (e.g., network service entity 550*a*. 750, 850*a*, 950*a*) may receive, access revocation 618A indicating to the SE 606 to exclude data associated with the disinforming actor (e.g., data from a particular component, or of a particular type, identified as being disinformation) from propagation and/or processing when providing an associated service.

At 1110, the base station may transmit, for the first wireless device, an indication of the at least one disinforming actor (e.g., a malfunctioning sensor). For example, 1110 may be performed by CU processor 1512, DU processor 1532, RU processor 1542, transceiver(s) 1546, antenna(s) 1580, network interface 1680, network processor 1612, or disinformation mitigation component 199 of FIG. 15 or 16. Based on the indication transmitted at 1110, the first wireless device, in some aspects, may omit data elements derived from an output of the at least one disinforming actor (e.g., malfunctioning sensor) in at least one subsequent set of data elements. Accordingly, the base station, in some aspects, may receive at least one subsequent set of data elements associated with the first wireless device omitting an output of the at least one malfunctioning sensor based on the indication of the at least one malfunctioning sensor. In some aspects, the indication transmitted at 1110 may include additional indications of a set of contexts, or a set of services, for which the information associated with the disinforming actor is to be omitted (and, by implication, contexts or services for which the information associated with the disinforming actor may be included in a subsequent set of data elements). For example, referring to FIGS. 5-9, the NE 602*a* (e.g., the network service entity 550*a* or the ML engines 755, 855*a*, 955*a* associated with an RU 540*c*, or base station 702, 802*a*, or 902*b*, respectively) may transmit an access revocation 618B to a UE 604 (e.g., the vUE 504*a*, 704*m*, 804*m*_1 to 804*m*_k, or 904*m*_1 to 904*m*_k, respectively) indicating an identity of a disinforming actor and a set of associated services and/or contexts for which the UE 604 is identified at 612 as a disinforming actor.

Finally, at 1112, the base station may provide, to a second network node, information regarding the one or more wireless devices identified as providing incorrect data elements. For example, 1112 may be performed by CU processor 1512, DU processor 1532, RU processor 1542, transceiver(s) 1546, antenna(s) 1580, network interface 1680, network processor 1612, or disinformation mitigation component 199 of FIG. 15 or 16. In some aspects, the second network node is a network node geographically adjacent to the first network node. For example, referring to FIGS. 5-9, the NE 602a, or base station 802a, or 902a (or RU 540c) may provide access list information 630 relating to the UE 604 (e.g., vUE 804m_1 to 804m_k, 904m_1 to 904m_k, or 504a) to NE 602b, or base station 802b, or 902b (or RU 540a or 540b) based on a crossing of a cell boundary (e.g., a boundary between area C2 and B1 or A2, or crossing a boundary 820 or 920).

Figure 12:
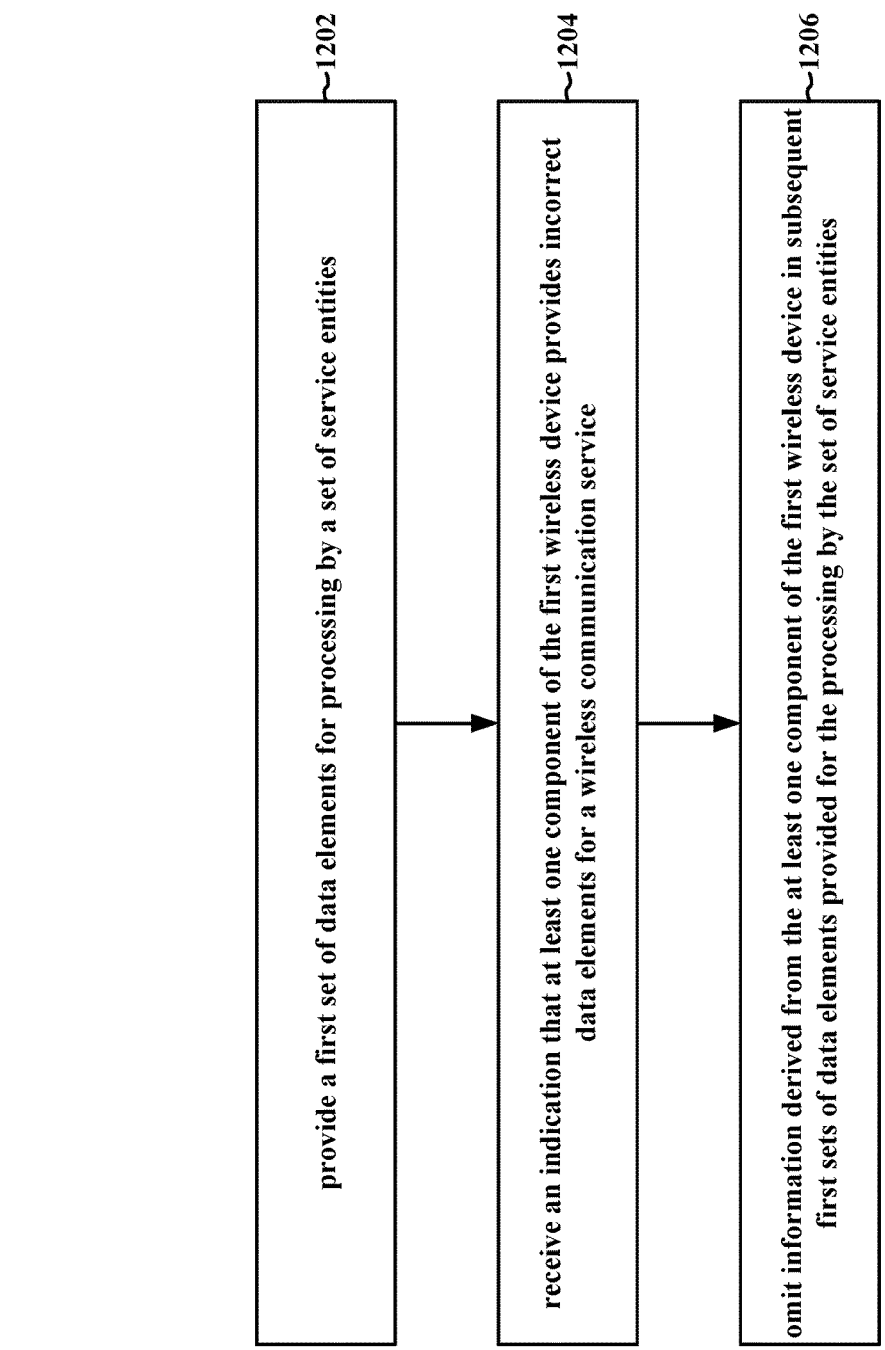
FIG. 12 is a flowchart of a method of wireless communication.

FIG. 12 is a flowchart 1200 of a method of wireless communication. The method may be performed by a first wireless device such as UE or vUE (e.g., the UE 104, 204, 504b, 504d, 504c, 504g, 604, 704b, 704n; 804b_1 to 804b_j. 804n_1 to 804n_p, 904b_1 to 904b_j, or 904n_1 to 904n_p; the vUE 504a, 504c, 504f, 704a, 704m, 804a_1 to 804a_i, 804m_1 to 804m_k, 904a_1 to 904a_i, or 904m_1 to 904m_k; the apparatus 1404). At 1202, the first wireless device may provide (or transmit), and a network entity may obtain (or receive), a first set of data elements for processing by a set of service entities. For example, 1202 may be performed by application processor 1406, cellular baseband processor 1424, transceiver(s) 1422, antenna(s) 1480, or disinformation mitigation component 198 of FIG. 14. The first set of data elements may, in some aspects, be based on information from one or more of a RADAR sensor, a LIDAR sensor, a camera, a GNSS, a GPS, or an IMU. The first set of data elements, in some aspects, may include data generated by a local ML service entity at the first wireless device. For example, referring to FIGS. 5-9, a UE 604 (e.g., a UE 704b, vUE 504a, 704m, 804m_1 to 804m_k, or 904m_1 to 904m_k) may provide the first set of data elements 608 to a NE 602a, or base station 702, 802a, or 902a (or RU 540c). The first set of data elements 608, in some aspects, may be generated by a set of sensors and/or a local ML service entity (e.g., local ML service entity 706b, 506a. 706a, 806m_1 to 806m_k, or 906a_1 to 906a_i, respectively), associated with the UE 604 (e.g., UE 704b, vUE 504a, 704m, 804m_1 to 804m_k, or 904m_1 to 904m_k).

The base station may identify the first wireless device as providing incorrect data elements based on the first set of data elements. The base station may revoke, for the first wireless device, access to at least one service in response to the first wireless device providing incorrect data elements for wireless communication. In some aspects, the at least one service may be associated with a service entity that provides a set of wireless communication services including at least the at least one service and a second service and revoking the access to the at least one service may include (1) revoking access to the at least one service in the at least one context and (2) not revoking access to the second service. Revoking the access to the at least one service entity, in some aspects, may include associating an identifier of the one or more wireless devices with an identifier of an entity providing the at least one service in one of a list, a database, a blockchain, or a data structure for maintaining information regarding network actors for which access to one or more services has been revoked. For example, referring to FIGS. 5-9, the NE 602a, or base station 702, 802a, or 902a (or RU 540c) may revoke access for the disinforming actor (e.g., the UE 604 and/or the component of the UE 604) for at least one service.

At 1204, the first wireless device may receive an indication that at least one component of the first wireless device provides incorrect data elements for a wireless communication service. For example, 1204 may be performed by application processor 1406, cellular baseband processor 1424, transceiver(s) 1422, antenna(s) 1480, or disinformation mitigation component 198 of FIG. 14. The at least one component, in some aspects, may be one of at least one sensor associated with the first wireless device, an onboard computing system associated with the first wireless device, or an onboard feature extraction system for extracting features from data captured by a sensor associated with the first wireless device. The indication received at 1204, in some aspects, may indicate that the at least one component of the first wireless device provides incorrect data elements comprises an indication that one of the at least one sensor, the onboard computing system, or the onboard feature extraction system has malfunctioned. In some aspects, the indication received at 1204 may indicate to the first wireless device to exclude data associated with the disinforming actor (e.g., data from the at least one component, the onboard computing system, or the onboard feature extraction system, or of a particular type, identified as being disinformation) from transmission in a subsequent set of data elements or from propagation and/or processing through a local ML service entity. In some aspects, the indication received at 1204 may include additional indications of a set of contexts, or a set of services, for which the information associated with the disinforming actor is to be omitted (and, by implication, contexts or services for which the information associated with the disinforming actor may be included in a subsequent set of data elements). For example, referring to FIGS. 5-9, the UE 604 (e.g., the vUE 504a, 704m, 804m_1 to 804m_k, or 904m_1 to 904m_k) may receive access revocation 618B from the NE 602a (e.g., the network service entity 550a or the ML engines 755, 855a, 955a associated with an RU 540c, or base station 702, 802a, or 902b, respectively) indicating an identity of a disinforming actor (the at least one component) and a set of associated services and/or contexts for which the UE 604 (or the at least one component of UE 604) is identified at 612 as a disinforming actor.

Based on the indication received at 1204, the first wireless device may omit, at 1206, information derived from the at least one component of the first wireless device in subsequent sets of data elements corresponding to the first set of data elements provided for the processing by the set of service entities. For example, 1206 may be performed by application processor 1406, cellular baseband processor 1424, transceiver(s) 1422, antenna(s) 1480, or disinformation mitigation component 198 of FIG. 14. In some aspects, the first wireless device may exclude data associated with the at least one component from transmission in a subsequent first set of data elements or from propagation and/or processing through a local ML service entity. In some aspects, the first wireless device is assumed to be trusted to implement the selective exclusion (e.g., is assumed to be tamper-proof). For example, referring to FIGS. 5-9, the UE 604 (e.g., the vUE 504a, 704m, 804m_1 to 804m_k, or 904m_1 to 904m_k) may generate, at 620, a second set of data elements based on the access revocation 618B by excluding information from a disinforming actor from the second data set or from propagation through a local ML service entity that produces information included in the second data set. The second set of data elements generated at 620 may then be transmitted to the NE 602a for processing by the SE 606.

In some aspects, the access revocation may be limited to a first set of services or contexts, and the first wireless device may transmit the information derived from the at least one component of the first wireless device in subsequent second sets of data elements provided for processing by a second service entity in the set of service entities that is not identified in the access revocation. For example, referring to FIGS. 5-9, the UE 604 (e.g., the vUE 504a, 704m, 804m_1 to 804m_k, or 904m_1 to 904m_k) may generate, at 620, the second set of data elements based on the access revocation 618B by excluding information from a disinforming actor from the second data set or from propagation through a local ML service entity that produces information included in the second data set when there is no service for which the information may be used, but may include the information in the second set of data when there is at least one service for which access has not been revoked. The second set of data elements generated at 620 may then be transmitted to the NE 602a for processing by the SE 606, where the SE 606 may exclude the information from the disinforming actor for those services identified in the access revocation 618A.

Figure 13:
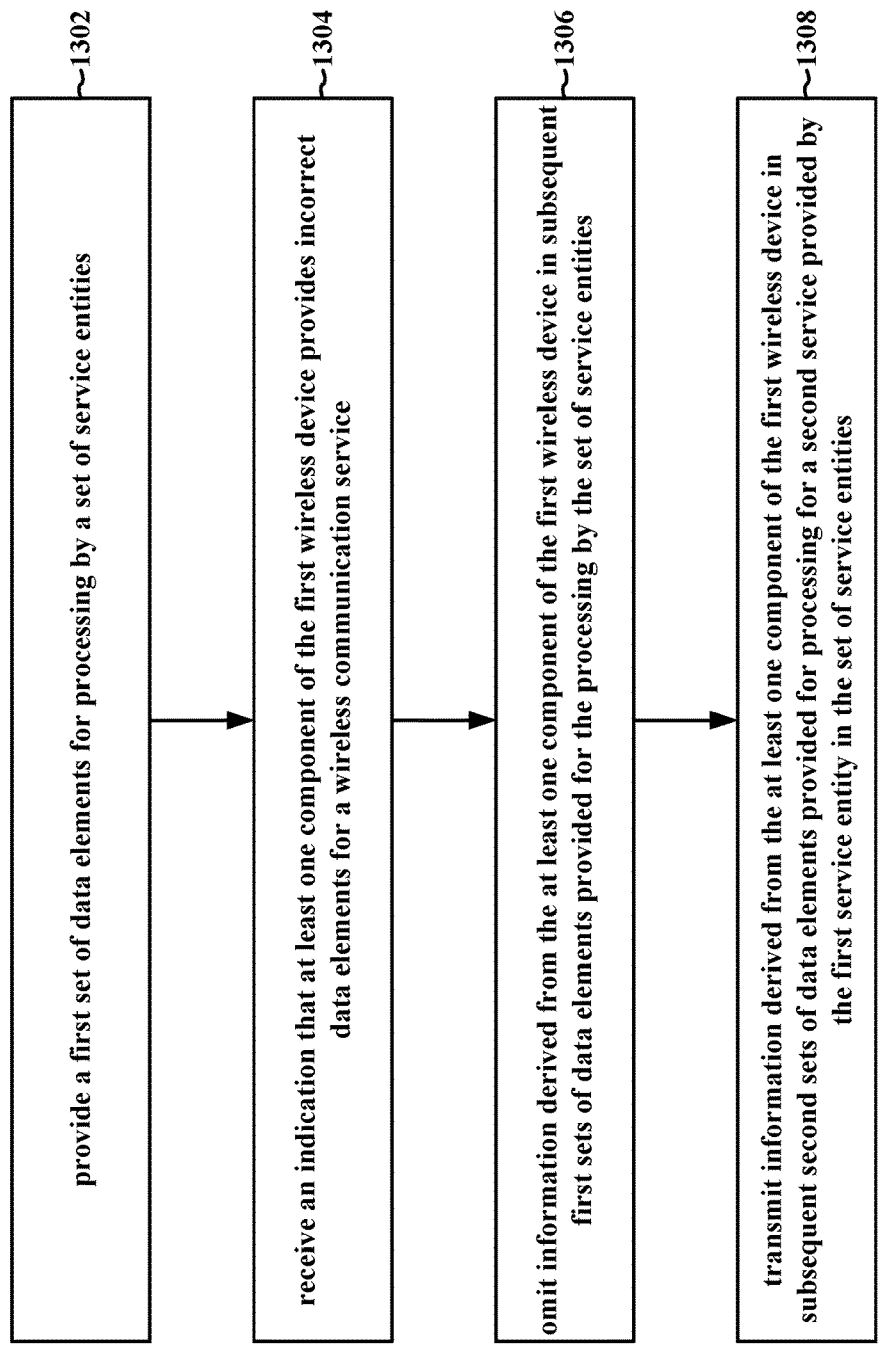
FIG. 13 is a flowchart of a method of wireless communication.

FIG. 13 is a flowchart 1300 of a method of wireless communication. The method may be performed by a first wireless device such as UE or vUE (e.g., the UE 104, 204, 504b, 504d, 504c, 504g, 604, 704b, 704n; 804b_1 to 804b_j, 804n_1 to 804n_p, 904b_1 to 904b_j, or 904n_1 to 904n_p; the vUE 504a, 504c, 504f, 704a, 704m, 804a_1 to 804a_i, 804m_1 to 804m_k, 904a_1 to 904a_i, or 904m_1 to 904m_k; the apparatus 1404). At 1302, the first wireless device may provide (or transmit), and a network entity may obtain (or receive), a first set of data elements for processing by a set of service entities. For example, 1302 may be performed by application processor 1406, cellular baseband processor 1424, transceiver(s) 1422, antenna(s) 1480, or disinformation mitigation component 198 of FIG. 14. The first set of data elements may, in some aspects, be based on information from one or more of a RADAR sensor, a LIDAR sensor, a camera, a GNSS, a GPS, or an IMU. The first set of data elements, in some aspects, may include data generated by a local ML service entity at the first wireless device. For example, referring to FIGS. 5-9, a UE 604 (e.g., a UE 704b, vUE 504a, 704m, 804m_1 to 804m_k, or 904m_1 to 904m_k) may provide the first set of data elements 608 to a NE 602a, or base station 702, 802a, or 902a (or RU 540c). The first set of data elements 608, in some aspects, may be generated by a set of sensors and/or a local ML service entity (e.g., local ML service entity 706b, 506a, 706a, 806m_1 to 806m_k, or 906a_1 to 906a_i, respectively), associated with the UE 604 (e.g., UE 704b, vUE 504a, 704m, 804m_1 to 804m_k, or 904m_1 to 904m_k).

The base station may identify the first wireless device as providing incorrect data elements based on the first set of data elements. The base station may revoke, for the first wireless device, access to at least one service in response to the first wireless device providing incorrect data elements for wireless communication. In some aspects, the at least one service may be associated with a service entity that provides a set of wireless communication services including at least the at least one service and a second service and revoking the access to the at least one service may include (1) revoking access to the at least one service in the at least one context and (2) not revoking access to the second service. Revoking the access to the at least one service entity, in some aspects, may include associating an identifier of the one or more wireless devices with an identifier of an entity providing the at least one service in one of a list, a database, a blockchain, or a data structure for maintaining information regarding network actors for which access to one or more services has been revoked. For example, referring to FIGS. 5-9, the NE 602a, or base station 702, 802a, or 902a (or RU 540c) may revoke access for the disinforming actor (e.g., the UE 604 and/or the component of the UE 604) for at least one service.

At 1304, the first wireless device may receive an indication that at least one component of the first wireless device provides incorrect data elements for a wireless communication service. For example, 1304 may be performed by application processor 1406, cellular baseband processor 1424, transceiver(s) 1422, antenna(s) 1480, or disinformation mitigation component 198 of FIG. 14. The at least one component, in some aspects, may one of at least one sensor associated with the first wireless device, an onboard computing system associated with the first wireless device, or an onboard feature extraction system for extracting features from data captured by a sensor associated with the first wireless device. The indication received at 1304, in some aspects, may indicate that the at least one component of the first wireless device provides incorrect data elements comprises an indication that one of the at least one sensor, the onboard computing system, or the onboard feature extraction system has malfunctioned. In some aspects, the indication received at 1304 may indicate to the first wireless device to exclude data associated with the disinforming actor (e.g., data from the at least one component, or of a particular type, identified as being disinformation) from transmission in a subsequent set of data elements or from propagation and/or processing through a local ML service entity. In some aspects, the indication received at 1304 may include additional indications of a set of contexts, or a set of services, for which the information associated with the disinforming actor is to be omitted (and, by implication, contexts or services for which the information associated with the disinforming actor may be included in a subsequent set of data elements). For example, referring to FIGS. 5-9, the UE 604 (e.g., the vUE 504a, 704m, 804m_1 to 804m_k, or 904m_1 to 90m_k) may receive access revocation 618B from the NE 602a (e.g., the network service entity 550a or the ML engines 755, 855a, 955a associated with an RU 540c, or base station 702, 802a, or 902b, respectively) indicating an identity of a disinforming actor (the at least one component) and a set of associated services and/or contexts for which the UE 604 (or the at least one component of UE 604) is identified at 612 as a disinforming actor.

Based on the indication received at 1304, the first wireless device may omit, at 1306, information derived from the at least one component of the first wireless device in subsequent sets of data elements corresponding to the first set of data elements provided for the processing by the set of service entities. For example, 1306 may be performed by application processor 1406, cellular baseband processor 1424, transceiver(s) 1422, antenna(s) 1480, or disinformation mitigation component 198 of FIG. 14. In some aspects, the first wireless device may exclude data associated with the at least one component from transmission in a subsequent first set of data elements or from propagation and/or processing through a local ML service entity. In some aspects, the first wireless device is assumed to be trusted to implement the selective exclusion (e.g., is assumed to be tamper-proof). For example, referring to FIGS. 5-9, the UE 604 (e.g., the vUE 504a, 704m, 804m_1 to 804m_k, or 904m_1 to 904m_k) may generate, at 620, a second set of data elements based on the access revocation 618B by excluding information from a disinforming actor from the second data set or from propagation through a local ML service entity that produces information included in the second data set. The second set of data elements generated at 620 may then be transmitted to the NE 602a for processing by the SE 606.

In some aspects, the access revocation may be limited to a first set of services or contexts, and the first wireless device may, at 1308, transmit the information derived from the at least one component of the first wireless device in subsequent second sets of data elements provided for processing by a second service entity in the set of service entities that is not identified in the access revocation. For example, 1308 may be performed by application processor 1406, cellular baseband processor 1424, transceiver(s) 1422, antenna(s) 1480, or disinformation mitigation component 198 of FIG. 14. For example, referring to FIGS. 5-9, the UE 604 (e.g., the vUE 504a, 704m, 804m_1 to 804m_k, or 904m_1 to 904m_k) may generate, at 620, the second set of data elements based on the access revocation 618B by excluding information from a disinforming actor from the second data set or from propagation through a local ML service entity that produces information included in the second data set when there is no service for which the information may be used, but may include the information in the second set of data when there is at least one service for which access has not been revoked. The second set of data elements generated at 620 may then be transmitted to the NE 602a for processing by the SE 606, where the SE 606 may exclude the information from the disinforming actor for those services identified in the access revocation 618A.

Figure 14:
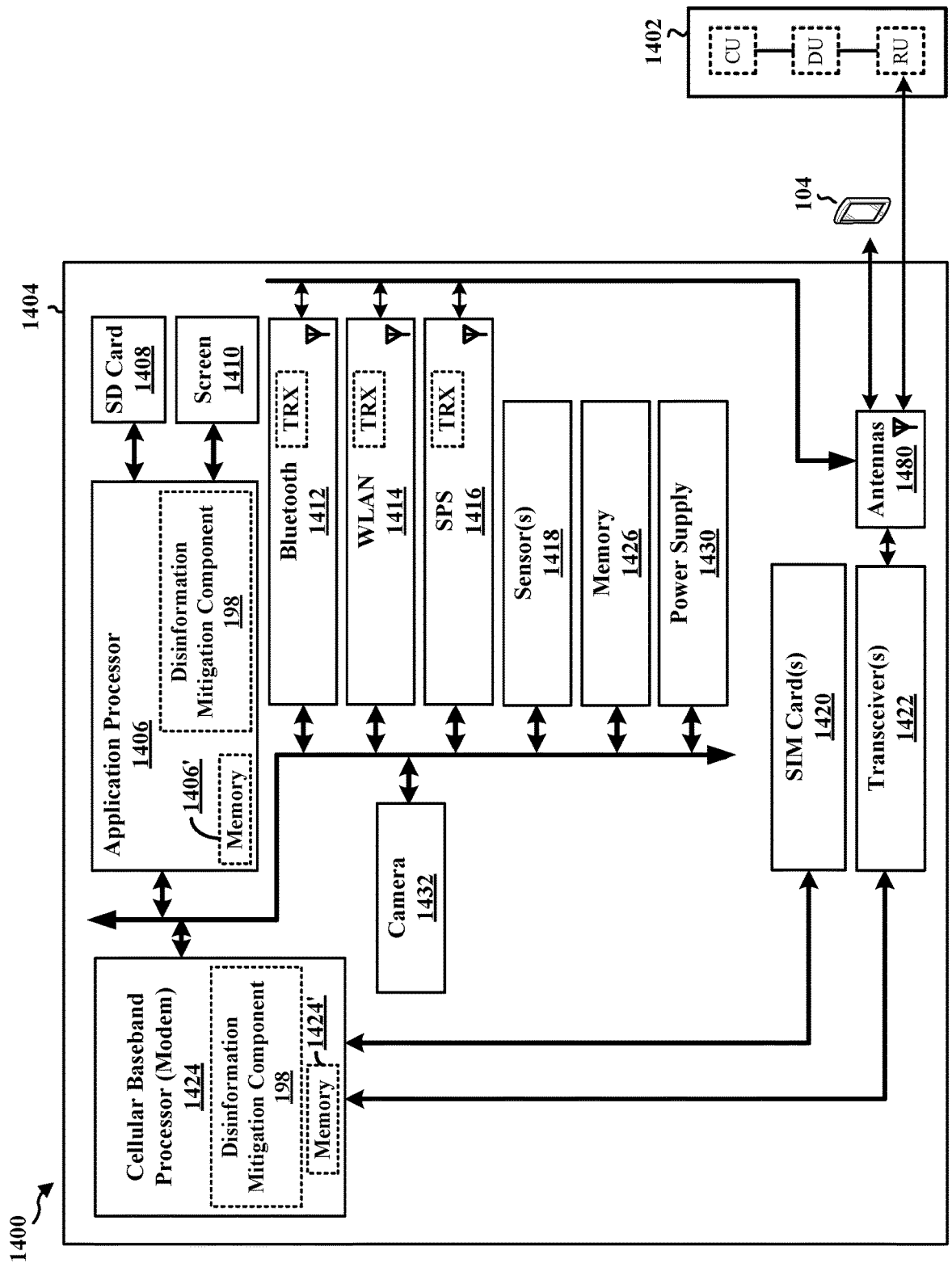
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 450 and may include the memory 460 and/or at least one of the TX processor 468, the RX processor 456, and the controller/processor 459. In one configuration, the apparatus 1404 may be a processor chip (modem and/or application) and include just the cellular baseband processor 1424 and/or the application processor 1406, and in another configuration, the apparatus 1404 may be the entire UE (e.g., sec 450 of FIG. 4) and include the additional modules of the apparatus 1404.

As discussed supra, the disinformation mitigation component 198 is configured to provide a first set of data elements for processing by a set of service entities; receive an indication that at least one component of the first wireless device provides incorrect data elements for a wireless communication service; and omit information derived from the at least one component of the first wireless device in subsequent sets of data elements corresponding to the first set of data elements provided for the processing by the set of service entities. The disinformation mitigation component 198 may be within the cellular baseband processor 1424, the application processor 1406, or both the cellular baseband processor 1424 and the application processor 1406. The disinformation mitigation component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for providing a first set of data elements for processing by a set of service entities. The apparatus 1404, and in particular the cellular baseband processor 1424 and/or the application processor 1406, may also include means for receiving an indication that at least one component of the first wireless device provides incorrect data elements for a wireless communication service. The apparatus 1404, and in particular the cellular baseband processor 1424 and/or the application processor 1406, may also include means for omitting information derived from the at least one component of the first wireless device in subsequent sets of data elements corresponding to the first set of data elements provided for the processing by the set of service entities. The apparatus 1404, and in particular the cellular baseband processor 1424 and/or the application processor 1406, may also include means for transmitting the information derived from the at least one component of the first wireless device in subsequent second sets of data elements provided for processing for a second service provided by the first service entity in the set of service entities. The apparatus may include means for performing any of the aspects described in connection with the flowcharts in FIG. 12 or 13 and/or the aspects performed by the UE in FIGS. 5-9. The means may be the disinformation mitigation component 198 of the apparatus 1404 configured to perform the functions recited by the means. As described supra, the apparatus 1404 may include the TX processor 468, the RX processor 456, and the controller/processor 459. As such, in one configuration, the means may be the TX processor 468, the RX processor 456, and/or the controller/processor 459 configured to perform the functions recited by the means.

Figure 15:
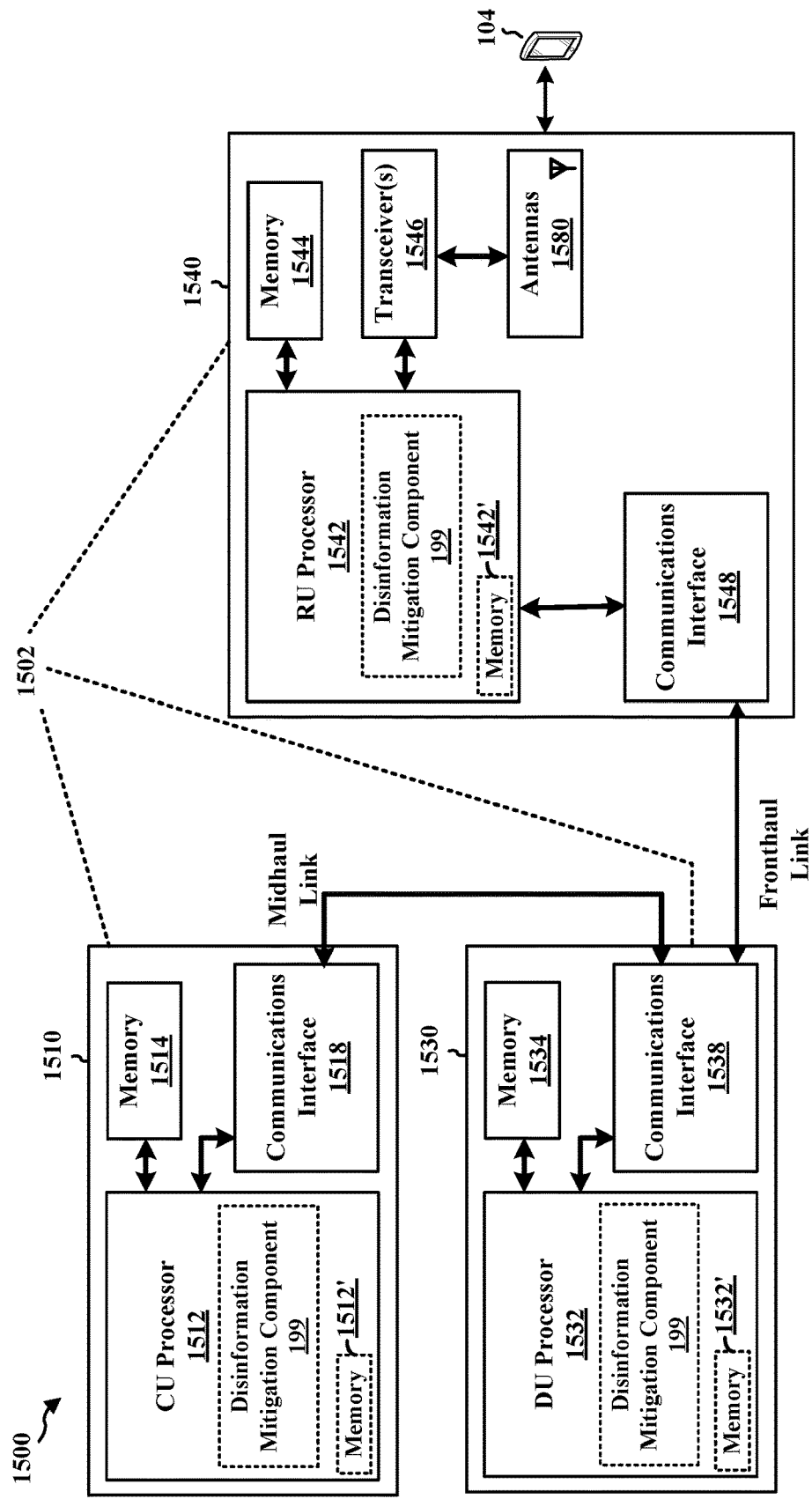
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the disinformation mitigation component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the disinformation mitigation component 199 is configured to revoke, for one or more wireless devices, access to at least one service in response to the one or more wireless devices providing incorrect data elements for a wireless communication service; and output an indication for data from the one or more wireless devices to be excluded from subsequent processing for the at least one service in at least one context. The disinformation mitigation component 199 may be within one or more processors of one or more of the CU 1510, DU 1530, and the RU 1540. The disinformation mitigation component 199 may be one or more hardware components specifically configured to carry out the stated processes/algorithm, implemented by one or more processors configured to perform the stated processes/ algorithm, stored within a computer-readable medium for implementation by one or more processors, or some combination thereof. The network entity 1502 may include a variety of components configured for various functions. In one configuration, the network entity 1502 includes means for revoking, for one or more wireless devices, access to at least one service in response to the one or more wireless devices providing incorrect data elements for a wireless communication service. The network entity 1502, may also include means for outputting an indication for data from the one or more wireless devices to be excluded from subsequent processing for the at least one service. The network entity 1502, may also include means for receiving a first set of data elements from a first wireless device in the one or more wireless devices. The network entity 1502, may also include means for identifying the first wireless device of the one or more wireless devices as providing incorrect data elements based on the first set of data elements. The network entity 1502, may also include means for transmitting, for the first wireless device, an indication of the at least one malfunctioning sensor. The network entity 1502, may also include means for receiving at least one subsequent set of data elements associated with the first wireless device omitting an output of the at least one malfunctioning sensor based on the indication of the at least one malfunctioning sensor. The network entity 1502, may also include means for providing, to a second network node, information regarding the one or more wireless devices identified as providing incorrect data elements, where the second network node is a network node geographically adjacent to the first network node. The apparatus may include means for performing any of the aspects described in connection with the flowcharts in FIG. 10 or 11 and/or the aspects performed by the base station, RU, or network entity in FIGS. 5-9. The means may be the disinformation mitigation component 199 of the network entity 1502 configured to perform the functions recited by the means. As described supra, the network entity 1502 may include the TX processor 416, the RX processor 470, and the controller/processor 475. As such, in one configuration, the means may be the TX processor 416, the RX processor 470, and/or the controller/processor 475 configured to perform the functions recited by the means.

Figure 16:
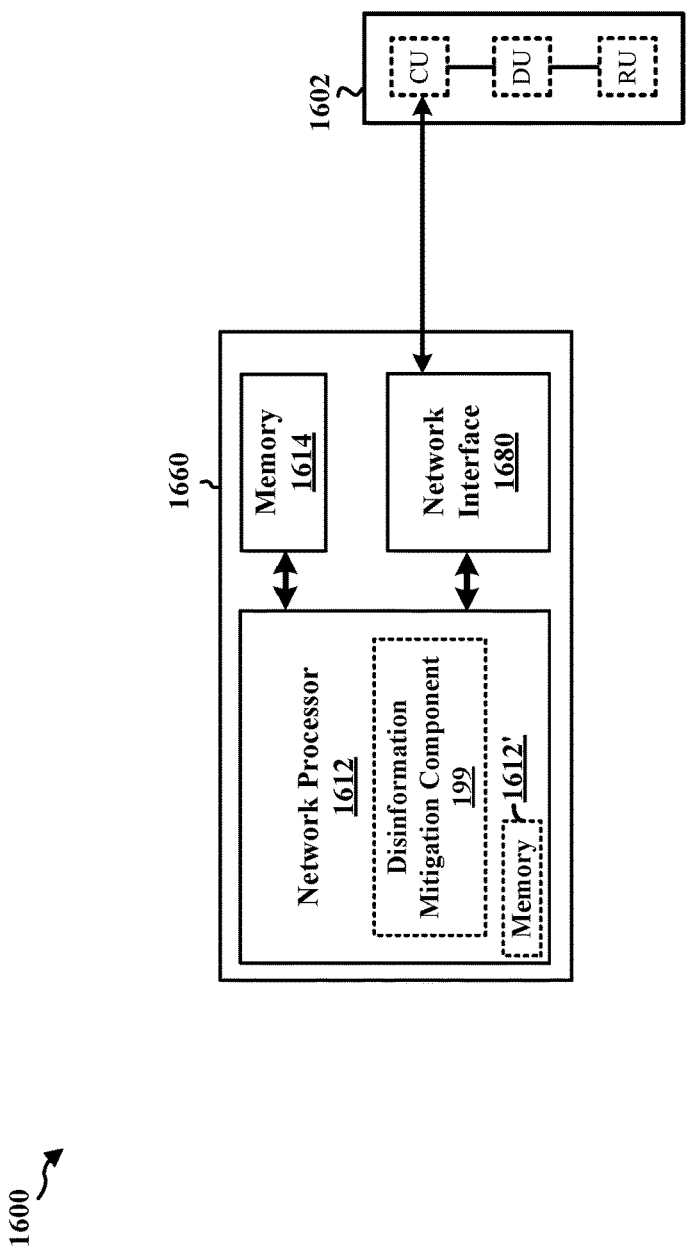
FIG. 16 is a diagram illustrating an example of a hardware implementation for an example network entity.

FIG. 16 is a diagram 1600 illustrating an example of a hardware implementation for a network entity 1660. In one example, the network entity 1660 may be within the core network 120. The network entity 1660 may include a network processor 1612. The network processor 1612 may include on-chip memory 1612'. In some aspects, the network entity 1660 may further include additional memory modules 1614. The network entity 1660 communicates via the network interface 1680 directly (e.g., backhaul link) or indirectly (e.g., through a RIC) with the CU 1602. The on-chip memory 1612' and the additional memory modules 1614 may each be considered a computer-readable medium/ memory. Each computer-readable medium/memory may be non-transitory. The processor 1612 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the disinformation mitigation component 199 is configured to revoke, for one or more wireless devices, access to at least one service entity in response to the one or more wireless devices providing incorrect data elements for wireless communication; and output an indication indicating for data from the one or more wireless devices to be excluded from subsequent processing. The disinformation mitigation component 199 may be within the processor 1612. The disinformation mitigation component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1660 may include a variety of components configured for various functions. In one configuration, the network entity 1660 includes means for revoking, for one or more wireless devices, access to at least one service entity in response to the one or more wireless devices providing incorrect data elements for wireless communication. The network entity 1660, may also include means for outputting an indication indicating for data from the one or more wireless devices to be excluded from subsequent processing. The network entity 1660, may also include means for receiving a first set of data elements from a first wireless device in the one or more wireless devices. The network entity 1660, may also include means for identifying the first wireless device of the one or more wireless devices as providing incorrect perception data based on the first set of data elements. The network entity 1660, may also include means for transmitting, for the first wireless device, an indication of the at least one malfunctioning sensor. The network entity 1660, may also include means for providing, to a second network node, information regarding the one or more wireless devices identified as providing incorrect data elements. The apparatus may include means for performing any of the aspects described in connection with the flow-charts in FIG. 10 or 11 and/or the aspects performed by the base station, RU, or network entity in FIGS. 5-9. The means may be the disinformation mitigation component 199 of the network entity 1660 configured to perform the functions recited by the means.

In some aspects of wireless communication, a communication network may include perceptive wireless communication components. Perceptive wireless communication may relate to communication systems that are assisted by the perception of the physical environment/world. The perception of the physical environment/world, in some aspects, includes measurement data and machine learning feature data gathered from vehicular sensors, e.g., RADAR, LIDAR, cameras, GNSS, IMU sensors. Communications tasks that benefit from perception, in some aspects, include beam management, beam blockage prediction, beam refinement, etc.

As a non-limiting example of perception wireless communication, sensing-related measurement data and feature data gathered from vehicles, may be combined with communications-related measurements and feature data to improve and/or refine the quality and/or efficiency of the communication systems. Perceptive wireless communication, thus, may involve reliable coordination, at multiple stages, between multiple independent agents/actors. In some aspects, the actors may include pedestrian UEs, in-vehicle UEs, vehicles, vehicular sensors, GPS devices, and/or other similar devices providing data for processing by (or propagating through) one or more AI/ML training/inference servers.

Rogue actors (actors whose information is misleading, incorrect, inaccurate, mistaken, misleading, corrupted, and/or deceptive) can introduce or cause error propagation at multiple stages of a perceptive wireless communication procedure. The misleading or incorrect information (e.g., misinformation) may include one or more of raw sensing data, bounding boxes and other features extracted from onboard ML models, UE/wireless device location, UE/wireless device orientation/velocity, and/or beam measurements at the UE. Therefore, one or more rogue actors can severely degrade the benefits from coordination among multiple actors, most of which may not be rogue actors. Robustness to such rogue actors may improve the usefulness (e.g., accuracy) of the perceptive wireless communication.

For a network comprising a number of network nodes spread over a large geographic area, maintaining a centralized list (or identification) of devices providing incorrect and/or misleading information for the large geographic area may demand and/or consume too many resources (e.g., too much storage space and/or memory or too much bandwidth for transmitting the information regarding the list or identification of devices). Accordingly, in some aspect of the disclosure, a method and/or apparatus is provided for maintaining manageable lists (e.g., lists that consume an acceptable amount of memory or bandwidth when transmitting information related to the list) of devices providing incorrect and/or misleading information while maintaining the integrity and/or accuracy of the perceptive wireless communication. The method and/or apparatus, in some aspects, uses a combination of centralized (e.g., for limited geographical regions) and local (e.g., at particular network elements or devices) access lists (or identification) of devices that have been classified as providing incorrect and/or misleading information.

Centralized (e.g., for a local geographic area) access permission lists, in some aspects, may be maintained. The centralized access permission lists may then be synchronized or coordinated (e.g., via a handover) between network entities (e.g., AI/ML service entities) or network nodes (e.g., base stations). In some aspects, centralized access lists may not be universal (e.g., may not cover a larger geographic region including a plurality of local geographic areas). The propagation and maintenance of access lists can be controlled by the network entity (such as the gNB) or by the network's service entity. The list may be provided to, and/or shared between, network entities or network nodes on a need-to-know basis or based on adjacency to the network node where the access determination was first made or triggered by mobility of the disinforming actor to keep the list size manageable.

Figure 17:
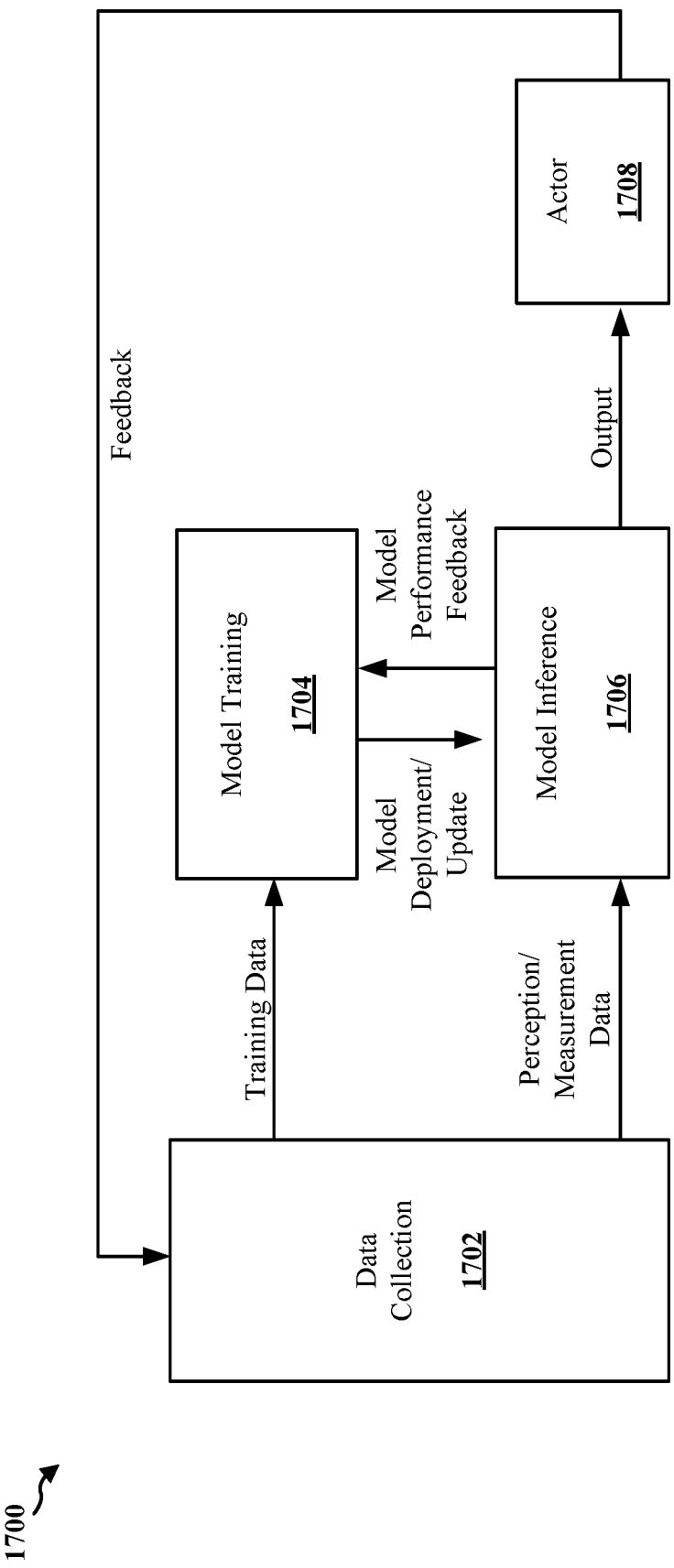
FIG. 17 illustrates example aspects of an AI/ML algorithm for a method of wireless communication in accordance with aspects presented herein.

FIG. 17 is an example of the AI/ML algorithm 1700 of a method of wireless communication. The AI/ML algorithm 1700 may include various functions including a data collection 1702, a model training function 1704, a model inference function 1706, and an actor 1708.

The data collection 1702 may be a function that provides input data to the model training function 1704 and the model inference function 1706. The data collection 1702 function may include any form of data preparation, and it may not be specific to the implementation of the AI/ML algorithm (e.g., data pre-processing and cleaning, formatting, and transformation). The examples of input data may include, but not limited to, measurements, and perception information, from entities including UEs or network nodes, feedback from the actor 1708, output from another AI/ML model. The data collection 1702 may include training data, which refers to the data to be sent as the input for the AI/ML model training function 1704, and inference data, which refers to be sent as the input for the AI/ML model inference function 1706.

The model training function 1704 may be a function that performs the ML model training, validation, and testing, which may generate model performance metrics as part of the model testing procedure. The model training function 1704 may also be responsible for data preparation (e.g. data pre-processing and cleaning, formatting, and transformation) based on the training data delivered or received from the data collection 1702 function. The model training function 1704 may deploy or update a trained, validated, and tested AI/ML model to the model inference function 1706, and receive a model performance feedback from the model inference function 1706.

The model inference function 1706 may be a function that provides the AI/ML model inference output (e.g. predictions or decisions). The model inference function 1706 may also perform data preparation (e.g. data pre-processing and cleaning, formatting, and transformation) based on the inference data delivered from the data collection 1702 function. The output of the model inference function 1706 may include the inference output of the AI/ML model produced by the model inference function 1706. The details of the inference output may be use-case specific. As an example, the output may include an identification of actors provide disinformation or misinformation, such as described in connection with any of FIGS. 5-13.

The model performance feedback may refer to information derived from the model inference function 1706 that may be suitable for improvement of the AI/ML model trained in the model training function 1704. The feedback from the actor 1708 or other network entities (via the data collection 1702 function) may be implemented for the model inference function 1706 to create the model performance feedback.

The actor 1708 may be a function that receives the output from the model inference function 1706 and triggers or performs corresponding actions. The actor may trigger actions directed to network entities including the other network entities or itself. The actor 1708 may also provide a feedback information that the model training function 1704 or the model interference function 1706 to derive training or inference data or performance feedback. The feedback may be transmitted back to the data collection 1702.

The network may use machine-learning algorithms, deep-learning algorithms, neural networks, reinforcement learning, regression, boosting, or advanced signal processing methods for aspects of wireless communication including the identification of actors providing disinformation or misinformation.

In some aspects described herein, the network may train one or more neural networks to learn dependence of measured qualities on individual parameters. Among others, examples of machine learning models or neural networks that may be comprised in the network entity include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; Bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network may include any number of nodes and any type of connections between nodes. The neural network may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network node, including revoking, for one or more wireless devices, access to at least one service for at least one context in response to the one or more wireless devices providing incorrect data elements for a wireless communication service; and outputting an indication for data from the one or more wireless devices to be excluded from subsequent processing for the at least one service in the at least one context.

Aspect 2 is the method of aspect 1, further including receiving a first set of data elements from a first wireless device of the one or more wireless devices; and identifying the first wireless device of the one or more wireless devices as providing the incorrect data elements based on the first set of data elements.

Aspect 3 is the method of aspect 2, where the identifying is performed by at least one of a ML component algorithm or a non-ML component algorithm.

Aspect 4, is the method of aspect 3, where the at least one of the ML component algorithm or the non-ML component algorithm includes at least one of a first component algorithm trained to detect fabricated data elements, a second component algorithm trained to detect altered data elements, a third component algorithm trained to detect one or more of duplicated or imitated data elements, or a fourth component algorithm trained to detect delayed reports of data elements.

Aspect 5 is the method of any of aspects 1 to 4, where identifying the first wireless device of the one or more wireless devices as providing the incorrect data elements based on the first set of data elements includes at least one of identifying that the first wireless device is configured to provide the incorrect data elements or that the first wireless device is associated with at least one malfunctioning sensor from which the incorrect data elements are derived.

Aspect 6 is the method of aspect 5, where identifying the first wireless device of the one or more wireless devices as providing the incorrect data elements based on the first set of data elements includes identifying with a threshold probability that subsequent sets of data elements obtained from the first wireless device are likely to include the incorrect data elements until a change to internal conditions operation of the first wireless device while the at least one context and the at least one service remain unchanged.

Aspect 7 is the method of aspect 6, further including indicating the at least one malfunctioning sensor for the first wireless device, and receiving at least one subsequent set of data elements associated with the first wireless device omitting an output of the at least one malfunctioning sensor based on the indication of the at least one malfunctioning sensor.

Aspect 8 is the method of any of aspects 1 to 7, where the at least one service is associated with a service entity that provides a set of wireless communication services including at least the at least one service and a second service and revoking the access to the at least one service includes revoking the access to the at least one service in the at least one context and allowing separate access to the second service.

Aspect 9 is the method of any of aspects 1 to 8, where revoking the access to the at least one service includes associating an entity identifier of the one or more wireless devices with an identifier of an entity providing the at least one service in one of a list, a database, a blockchain, or a data structure for maintaining information regarding network actors for which access to a plurality of services has been revoked.

Aspect 10 is the method of any of aspects 1 to 9, further including providing, to a second network node, information regarding the one or more wireless devices identified as providing the incorrect data elements.

Aspect 11, is the method of aspect 10, where the first network node is one of a first base station or a first network entity, the one or more wireless devices includes one or more of a UE or a vUE, and the second network node is one of a second base station or a second network entity geographically adjacent to the first network node.

Aspect 12 is the method of any of aspects 1 to 11, where the incorrect data elements are perception information data elements based on information from one or more of a RADAR sensor, a LIDAR sensor, a camera, a GNSS, or an IMU.

Aspect 13 is a method of wireless communication at a first wireless device including providing a first set of data elements for processing by a set of service entities; receiving an indication that at least one component of the first wireless device provides incorrect data elements for a wireless communication service; and omitting information derived from the at least one component of the first wireless device in subsequent sets of data elements corresponding to the first set of data elements provided for the processing by the set of service entities.

Aspect 14, is the method of aspect 13, where the at least one component of the first wireless device is one of at least one sensor associated with the first wireless device, an onboard computing system associated with the first wireless device, or an onboard feature extraction system for extracting features from data captured by a sensor associated with the first wireless device.

Aspect 15 is the method of aspect 14, where the indication that the at least one component of the first wireless device provides the incorrect data elements indicates that one of the at least one sensor, the onboard computing system, or the onboard feature extraction system has malfunctioned.

Aspect 16 is the method of any of aspects of 13 to 15, where the indication that the at least one component of the first wireless device provides the incorrect data elements is associated with a first service provided by a first service entity in the set of service entities, and the subsequent sets of data elements corresponding to the first set of data elements are associated with the first service, the method further including transmitting the information derived from the at least one component of the first wireless device in subsequent second sets of data elements provided for processing for a second service provided by the first service entity in the set of service entities.

Aspect 17 is an apparatus for wireless communication at a device including a memory and at least one processor coupled to the memory and, based at least in part on information stored in the memory, the at least one processor is configured to implement any of aspects 1 to 16.

Aspect 18 is the apparatus of aspect 17, further including a transceiver or an antenna coupled to the at least one processor.

Aspect 19 is an apparatus for wireless communication at a device including means for implementing any of aspects 1 to 16.

Aspect 20 is a computer-readable medium (e.g., a non-transitory computer-readable medium) storing computer executable code, where the code when executed by a processor causes the processor to implement any of aspects 1 to 16.

What is claimed is:

1. An apparatus for wireless communication at a first network node, comprising:
   memory; and
   one or more processors coupled to the memory and configured to cause the first network node to:
   receive, for at least one service, a first set of incorrect perception information data elements from a first wireless device;
   identify, based on the first set of incorrect perception information data elements and with a threshold probability, that subsequent sets of perception information data elements obtained from the first wireless device are likely to include incorrect perception information data elements in at least one context and for the at least one service during a time period associated with a first set of conditions, wherein the first set of conditions comprises at least one of one or more internal conditions at the first wireless device or an operation of the first wireless device;
   revoke, for at least the first wireless device, access to the at least one service for the at least one context in response to an identification that the subsequent sets of perception information data elements obtained from the first wireless device are likely to include perception information data elements that are incorrect; and output an indication to exclude data from the first wireless device from processing for the at least one service in the at least one context, until a change to at least one condition in the first set of conditions.

2. The apparatus of claim 1, wherein, to cause the first network node to identify that the subsequent sets of perception information data elements obtained from the first wireless device are likely to include the incorrect perception information data elements, the one or more processors are configured to cause the first network node to:
identify the first set of incorrect perception information data elements as incorrect based on an analysis of the first set of incorrect perception information data elements.

3. The apparatus of claim 2, wherein, to identify the first set of incorrect perception information data elements as incorrect, the one or more processors are configured to cause the first network node to use at least one of a machine learning (ML) component algorithm or a non-ML component algorithm.

4. The apparatus of claim 3, wherein the at least one of the ML component algorithm or the non-ML component algorithm comprises at least one of a first component algorithm trained to detect fabricated perception information data elements, a second component algorithm trained to detect altered perception information data elements, a third component algorithm trained to detect one or more of duplicated or imitated perception information data elements, or a fourth component algorithm trained to detect delayed reports of the perception information data elements.

5. The apparatus of claim 2, wherein, to identify the first set of incorrect perception information data elements as incorrect, the one or more processors are further configured to cause the first network node to identify that the first wireless device is configured to provide the incorrect perception information data elements or that the first wireless device is associated with at least one malfunctional sensor from which the first set of incorrect perception information data elements are derived.

6. The apparatus of claim 5, wherein the one or more processors are further configured to cause the first network node to:
transmit an additional indication of the at least one malfunctional sensor for the first wireless device; and
receive at least one subsequent set of perception information data elements associated with the first wireless device that omits an output of the at least one malfunctional sensor based on the additional indication of the at least one malfunctional sensor.

7. The apparatus of claim 1, wherein the at least one service is associated with a service entity that provides a set of wireless communication services, which includes at least the at least one service and a second service, and to revoke the access to the at least one service, the one or more processors are configured to cause the first network node to:
revoke the access to the at least one service in the at least one context, and
allow separate access to the second service.

8. The apparatus of claim 1, wherein to revoke the access to the at least one service, the one or more processors are configured to cause the first network node to associate an identifier of the first wireless device with an entity identifier of an entity that provides the at least one service in one of a list, a database, a blockchain, or a data structure that maintains information about network actors for which the access to one or more services has been revoked.

9. The apparatus of claim 1, wherein the one or more processors are further configured to cause the first network node to:
provide, to a second network node, information about the first wireless device identified as a source of the incorrect perception information data elements.

10. The apparatus of claim 9, wherein the first network node is one of a first base station or a first network entity, wherein the first wireless device comprises one or more of a user equipment (UE) or a vehicular UE, and wherein the second network node is one of a second base station or a second network entity geographically adjacent to the first network node.

11. The apparatus of claim 1, wherein the incorrect perception information data elements are based on information from one or more of a radio detection and ranging (RADAR) sensor, a light detection and ranging (LIDAR) sensor, a camera, a global navigation satellite system (GNSS), or an inertial measurement unit (IMU).

12. The apparatus of claim 1, wherein the first set of conditions further comprises no change to the at least one context and the at least one service.

13. An apparatus for wireless communication at a first wireless device, comprising:
memory; and
one or more processors coupled to the memory and configured to cause the first wireless device to:
provide a first set of perception information data elements for processing by a set of service entities;
receive, based on the first set of perception information data elements, an indication that subsequent perception information data elements obtained from at least one component of the first wireless device are, with a threshold probability, likely to include incorrect perception information data elements in at least one context and for at least one service until at least one of a first change of one or more internal conditions at the first wireless device or a second change of an operation of the first wireless device; and
provide, for the processing by the set of service entities, one or more subsequent sets of perception information data elements that omit information derived from the at least one component of the first wireless device.

14. The apparatus of claim 13, wherein the at least one component of the first wireless device is one of at least one sensor associated with the first wireless device, an onboard computing system associated with the first wireless device, or an onboard feature extraction system for extraction of one or more features from data captured by a sensor associated with the first wireless device.

15. The apparatus of claim 14, wherein the indication that the at least one component of the first wireless device provides the incorrect perception information data elements indicates that one of the at least one sensor, the onboard computing system, or the onboard feature extraction system has malfunctioned.

16. The apparatus of claim 13, wherein the indication that the at least one component of the first wireless device provides the incorrect perception information data elements is associated with a first service provided by a first service entity in the set of service entities, and the one or more subsequent sets of perception information data elements are associated with the first service, wherein the one or more processors are further configured to cause the first wireless device to:

transmit the information derived from the at least one component of the first wireless device in subsequent second sets of perception information data elements provided for a second processing by a second service provided by the set of service entities.

17. A method of wireless communication at a first network node, comprising:
receiving, for at least one service, a first set of incorrect perception information data elements from a first wireless device;
identifying, based on the first set of incorrect perception information data elements and with a threshold probability, that subsequent sets of perception information data elements obtained from the first wireless device are likely to include incorrect perception information data elements in at least one context and for the at least one service during a time period associated with a first set of conditions, wherein the first set of conditions comprises at least one of one or more internal conditions at the first wireless device or an operation of the first wireless device;
revoking, for at least the first wireless device, access to the at least one service for the at least one context in response to an identification that the subsequent sets of perception information data elements obtained from the first wireless device are likely to include perception information data elements that are incorrect; and
outputting an indication to exclude data from the first wireless device from processing for the at least one service in the at least one context, until a change to at least one condition in the first set of conditions.

18. The method of claim 17, further comprising:
identifying the first set of incorrect perception information data elements as incorrect based on an analysis of the first set of incorrect perception information data elements.

19. The method of claim 18, wherein identifying the first set of incorrect perception information data elements as incorrect is performed by at least one of a machine learning (ML) component algorithm or a non-ML component algorithm comprising at least one of a first component algorithm trained to detect fabricated perception information data elements, a second component algorithm trained to detect altered perception information data elements, a third component algorithm trained to detect one or more of duplicated or imitated perception information data elements, or a fourth component algorithm trained to detect delayed reports of the perception information data elements.

20. The method of claim 18, wherein identifying the first set of incorrect perception information data elements as incorrect based on the analysis of the first set of incorrect perception information data elements comprises at least one of identifying that the first wireless device is configured to provide the incorrect perception information data elements or that the first wireless device is associated with at least one malfunctioning sensor from which the first set of incorrect perception information data elements are derived.

21. The method of claim 20 further comprising:
transmitting an additional indication of the at least one malfunctioning sensor for the first wireless device; and
receiving at least one subsequent set of perception information data elements associated with the first wireless device omitting an output of the at least one malfunctioning sensor based on the additional indication of the at least one malfunctioning sensor.

22. The method of claim 17, wherein the at least one service is associated with a service entity that provides a set of wireless communication services including at least the at least one service and a second service and revoking the access to the at least one service comprises:
revoking the access to the at least one service in a set of contexts, and
allowing separate access to the second service.

23. The method of claim 17, wherein revoking the access to the at least one service comprises associating an identifier of the first wireless device with an entity identifier of an entity providing the at least one service in one of a list, a database, a blockchain, or a data structure that maintains information regarding network actors for which the access to a plurality of services has been revoked.

24. The method of claim 17, further comprising:
providing, to a second network node, information regarding the first wireless device identified as providing the incorrect perception information data elements, wherein the first network node is one of a first base station or a first network entity, wherein the first wireless device comprises one or more of a user equipment (UE) or a vehicular UE, and wherein the second network node is one of a second base station or a second network entity geographically adjacent to the first network node.

25. The method of claim 17, wherein the incorrect perception information data elements are based on information from one or more of a radio detection and ranging (RADAR) sensor, a light detection and ranging (LIDAR) sensor, a camera, a global navigation satellite system (GNSS), or an inertial measurement unit (IMU).

26. A method of wireless communication at a first wireless device, comprising:
providing a first set of perception information data elements for processing by a set of service entities;
receiving, based on the first set of perception information data elements, an indication that subsequent perception information data elements obtained from at least one component of the first wireless device are, with a threshold probability, likely to include incorrect perception information data elements in at least one context and for at least one service until at least one of a first change of one or more internal conditions at the first wireless device or a second change of an operation of the first wireless device; and
providing, for the processing by the set of service entities, one or more subsequent sets of perception information data elements omitting information derived from the at least one component of the first wireless device.

27. The method of claim 26, wherein the at least one component of the first wireless device is one of at least one sensor associated with the first wireless device, an onboard computing system associated with the first wireless device, or an onboard feature extraction system for extracting one or more features from data captured by a sensor associated with the first wireless device.

28. The method of claim 27, wherein the indication that the at least one component of the first wireless device provides the incorrect perception information data elements indicates that one of the at least one sensor, the onboard computing system, or the onboard feature extraction system has malfunctioned.

29. The method of claim 26, wherein the indication that the at least one component of the first wireless device provides the incorrect perception information data elements is associated with a first service provided by a first service entity in the set of service entities, and the one or more subsequent sets of perception information data elements are associated with the first service, the method further comprising:

transmitting the information derived from the at least one component of the first wireless device in subsequent second sets of perception information data elements provided for a second processing for a second service provided by the set of service entities.

30. A non-transitory computer-readable medium storing computer executable code at a first network node, the code when executed by one or more processors causes the first network node to:

receive, for at least one service, a first set of incorrect perception information data elements from a first wireless device;

identify, based on the first set of incorrect perception information data elements and with a threshold probability, that subsequent sets of perception information data elements obtained from the first wireless device are likely to include incorrect perception information data elements in at least one context and for the at least one service during a time period associated with a first set of conditions, wherein the first set of conditions comprises at least one of one or more internal conditions at the first wireless device or an operation of the first wireless device;

revoke, for at least the first wireless device, access to the at least one service for the at least one context in response to an identification that the subsequent sets of perception information data elements obtained from the first wireless device are likely to include perception information data elements that are incorrect; and output an indication to exclude data from the first wireless device from processing for the at least one service in the at least one context, until a change to at least one condition in the first set of conditions.

31. A non-transitory computer-readable medium storing computer executable code at a first wireless device, the code when executed by one or more processors causes the first wireless device to:

provide a first set of perception information data elements for processing by a set of service entities;

receive, based on the first set of perception information data elements, an indication that subsequent perception information data elements obtained from at least one component of the first wireless device are, with a threshold probability, likely to include incorrect perception information data elements in at least one context and for at least one service until at least one of a first change of one or more internal conditions at the first wireless device or a second change of an operation of the first wireless device; and provide, for the processing by the set of service entities, one or more subsequent sets of perception information data elements that omit information derived from the at least one component of the first wireless device.

* * * * *